(12) United States Patent
Shen

(10) Patent No.: US 12,260,508 B2
(45) Date of Patent: Mar. 25, 2025

(54) PROVIDING CONTEXT-AWARE AVATAR EDITING WITHIN AN EXTENDED-REALITY ENVIRONMENT

(71) Applicant: Meta Platforms Technologies, LLC, Menlo Park, CA (US)

(72) Inventor: Yue Shen, Pleasanton, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/658,194

(22) Filed: Apr. 6, 2022

(65) Prior Publication Data

US 2023/0281940 A1    Sep. 7, 2023

Related U.S. Application Data

(60) Provisional application No. 63/268,964, filed on Mar. 7, 2022.

(51) Int. Cl.
*G06T 19/20* (2011.01)
*G06F 3/04815* (2022.01)
(Continued)

(52) U.S. Cl.
CPC .......... *G06T 19/20* (2013.01); *G06F 3/04815* (2013.01); *G06F 3/0482* (2013.01);
(Continued)

(58) Field of Classification Search
None
See application file for complete search history.

(56) References Cited

U.S. PATENT DOCUMENTS 8,402,094 B2   3/2013   Bosworth et al.
9,654,591 B2   5/2017   Matus
(Continued)

OTHER PUBLICATIONS

Jessica Sanchez, Changing Your Clothing in Second Life, Sep. 8, 2014, Youtube, 0:00-6:36. (Year: 2014).*

(Continued)

*Primary Examiner* — Robert J Craddock
(74) *Attorney, Agent, or Firm* — McDermott Will & Emery LLP

(57) ABSTRACT

Systems, methods, client devices, and non-transitory computer-readable media are disclosed for displaying a context-aware avatar overlay editor within an active extended-reality environment to modify an avatar without suspending or navigating away from the extended-reality environment. For example, the disclosed systems can provide an integrated avatar overlay editor within an application corresponding to the extended-reality environment. Furthermore, the disclosed systems can utilize the integrated avatar overlay editor to provide, for display as an overlay user interface in the extended-reality environment, a context-aware avatar overlay editor. In addition, the disclosed systems can utilize a contextual recommendation engine to provide avatar modifications within the context-aware avatar overlay editor that are relevant to the active extended-reality environment. Indeed, the disclosed systems can receive selections within the context-aware avatar overlay editor and can modify an appearance of the avatar on-the-fly without suspending or leaving the extended-reality environment.

20 Claims, 18 Drawing Sheets

(51) Int. Cl.
*G06F 3/0482* (2013.01)
*G06T 19/00* (2011.01)
*G06V 20/20* (2022.01)

(52) U.S. Cl.
CPC ............ *G06T 19/006* (2013.01); *G06V 20/20* (2022.01); *G06T 2210/61* (2013.01)

(56) References Cited

U.S. PATENT DOCUMENTS

| | | |
|---|---|---|
| 10,304,066 B2 | 5/2019 | Tseng et al. |
| 2012/0166532 A1 | 6/2012 | Juan et al. |
| 2018/0095636 A1 | 4/2018 | Valdivia et al. |
| 2021/0104100 A1 | 4/2021 | Whitney et al. |
| 2022/0101614 A1* | 3/2022 | Luo ..................... G06T 19/006 |

OTHER PUBLICATIONS

International Search Report and Written Opinion for International Application No. PCT/US2023/014554, mailed May 24, 2023, 9 pages.

* cited by examiner

PROVIDING CONTEXT-AWARE AVATAR EDITING WITHIN AN EXTENDED-REALITY ENVIRONMENT

CROSS-REFERENCE TO RELATED APPLICATIONS

This application claims the benefit of, and priority to, U.S. Provisional Application No. 63/268,964, entitled "PROVIDING CONTEXT-AWARE AVATAR EDITING WITHIN AN EXTENDED-REALITY ENVIRONMENT," filed Mar. 7, 2022, the contents of which are hereby incorporated by reference in their entirety.

BACKGROUND

Recent years have seen significant advancement in hardware and software platforms for generating and providing extended reality experiences. Indeed, extended reality (virtual reality, augmented reality, mixed reality, etc.) has grown in popularity, and technological advancements have facilitated its use in a variety of applications, such as gaming, work meetings, entertainment viewing, online shopping, military training, and tourism. In some instances, conventional extended reality systems enable users to communicate with and view one another in an extended-reality environment. For example, these extended reality systems can allow a user to join an extended-reality environment as a digital character—often referred to as an avatar—and communicate with co-users via their corresponding avatars.

Despite these advances, however, conventional extended reality systems often suffer from several technological shortcomings that result in rigid, inaccurate, and inefficient operation. For instance, conventional extended reality systems are often inflexible in that they limit the number of visual changes that can be made to system avatars while presenting or actively rendering an extended-reality environment. In particular, conventional extended reality systems often fail to create an immersive visual experience due to inaccurate avatar representations that are not relevant to a changing extended-reality environment.

Due to the rigidness and inaccuracies of modifying avatar appearances in many conventional extended reality systems, these conventional systems are also often inefficient. For example, in order to access and modify an appearance of a system-wide avatar, many conventional extended reality systems require exiting an extended-reality environment and navigating to another application dedicated to modifying the avatar. Accordingly, oftentimes conventional extended reality systems frequently suspend an extended-reality environment, load a separate avatar editing application, and navigate the user to the avatar editing application to make changes in avatar appearance, navigate back to the extended-reality environment, and resume the extended-reality environment. This process, frequently repeated during changes in the extended-reality environment, often requires conventional extended reality systems to utilize an inefficient number of computational resources (and loading time).

These, along with additional problems and issues, exist with regard to conventional extended reality systems.

SUMMARY

Embodiments of the present disclosure provide benefits and/or solve one or more of the foregoing or other problems in the art with systems, non-transitory computer-readable media, and methods that display a context-aware avatar overlay editor within an active extended-reality environment to modify an avatar without navigating away from the extended-reality environment. For example, the disclosed systems can provide, for display within a graphical user interface (e.g., within an extended-reality device for a virtual and/or augmented reality environment), an extended-reality environment having one or more avatars. In one or more instances, the disclosed systems provide an integrated avatar overlay editor within an application corresponding to the extended-reality environment. Upon receiving a user interaction indicating a request to modify an appearance of an avatar corresponding to the user, the disclosed systems can utilize the integrated avatar overlay editor to provide, for display as an overlay user interface in the extended-reality environment, a context-aware avatar overlay editor without exiting or suspending the extended-reality environment. In addition, the disclosed systems can utilize a contextual recommendation engine to provide avatar modifications within the context-aware avatar overlay editor that are relevant to the active extended-reality environment. Indeed, the disclosed systems can receive selections within the context-aware avatar overlay editor and can modify an appearance of the avatar on-the-fly without suspending or leaving the extended-reality environment.

BRIEF DESCRIPTION OF THE DRAWINGS

The detailed description is described with reference to the accompanying drawings in which.

DETAILED DESCRIPTION

Figure 1:
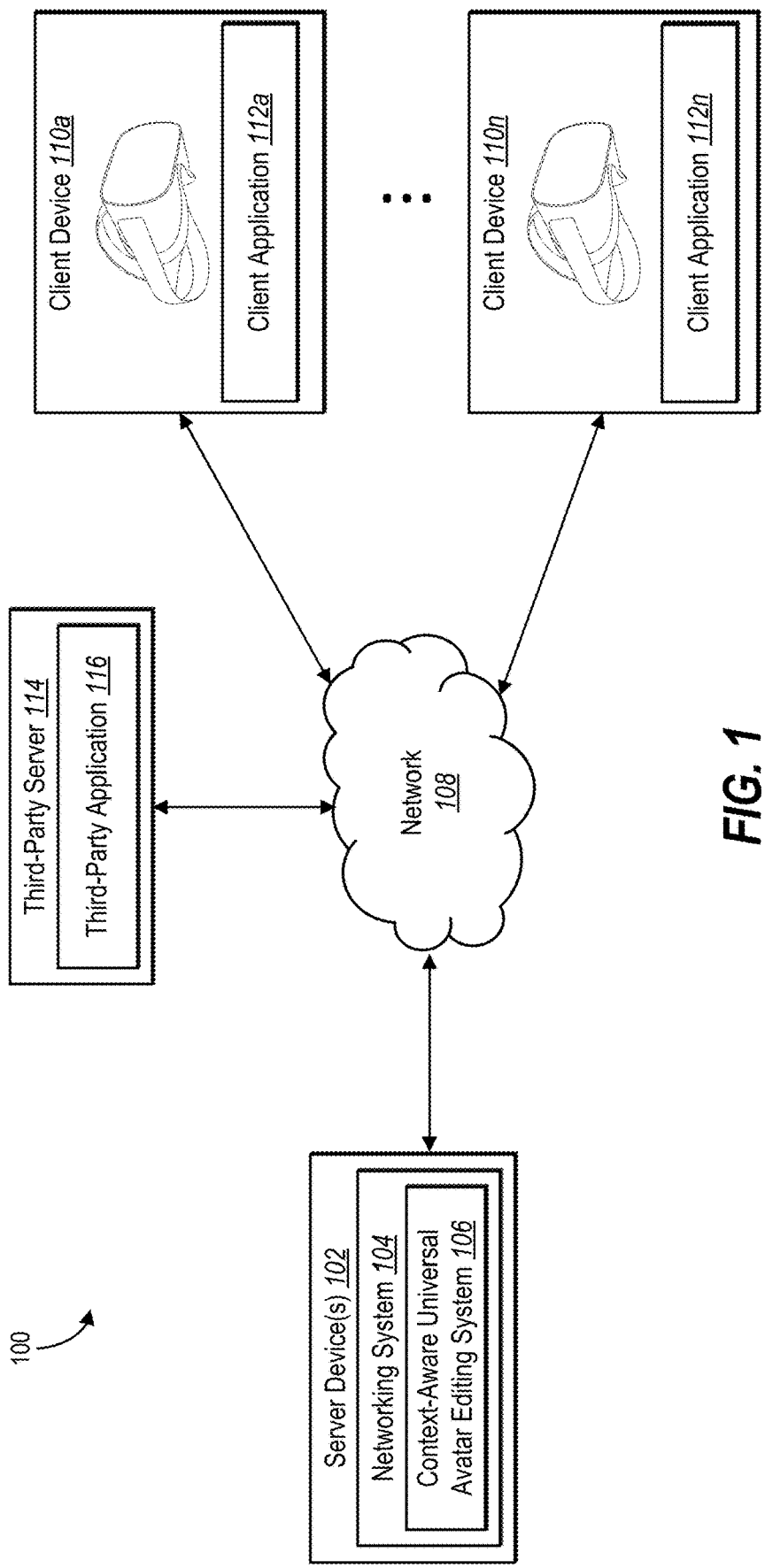
FIG. 1 illustrates an example environment in which a context-aware universal avatar editing system can operate in accordance with one or more implementations.

One or more embodiments described herein include a context-aware universal avatar editing system that generates, for display to a user via an extended-reality device, a context-aware avatar overlay editor within an active extended-reality environment to modify an avatar without suspending or exiting the extended-reality environment. For example, the context-aware universal avatar editing system can utilize an integrated avatar overlay editor within an application corresponding to the extended-reality environment to provide, for display as an overlay user interface in the extended-reality environment, a context-aware avatar overlay editor to modify an appearance of a user's avatar without suspending or exiting the extended-reality environment. Moreover, in one or more implementations, the context-aware universal avatar editing system also provides modification options for avatar elements (e.g., digital skins, digital outfits, digital accessories, digital faces) that are contextually relevant to the active extended-reality environment (and the user) utilizing a contextual recommendation engine.

To illustrate, in one or more embodiments, the context-aware universal avatar editing system generates a system-wide avatar that represents a user across various extended-reality environments operating within an extended-reality platform implemented on an extended-reality device. Indeed, an application executing and presenting an extended-reality environment can display an environment in which participating users are represented as avatars that communicate and interact with realistic body movements, facial expressions, and digital voice chat. In many implementations, the application executing and presenting the extended-reality environment creates an immersive experience in which the users communicate via avatars that digitally represent the users such that a perception is created the users exist in the same environment (e.g., meeting in a real-world setting).

Furthermore, the context-aware universal avatar editing system can provide applications operating on the extended-reality platform an integrated avatar overlay editor data package that enables the applications to connect the user to an avatar editor that is implemented by the extended-reality platform within the application executing an extended-reality environment. In particular, upon receiving a user interaction within the application executing and displaying the extended-reality environment to access an avatar editor, the context-aware universal avatar editing system (via the integrated avatar overlay editor data package) can display a context-aware avatar overlay editor to modify an appearance of a user's avatar that overlays the application's extended-reality environment without suspending or exiting the extended-reality environment. In some implementations, the context-aware universal avatar editing system receives selections within the context-aware avatar overlay editor and modifies the appearance of the avatar within the application's extended-reality environment. Indeed, the context-aware universal avatar editing system modifies the appearance of the avatar such that the modifications remain constant across other extended-reality environments provided by other applications when the user navigates to another extended-reality environment.

Additionally, as mentioned above, the context-aware universal avatar editing system can utilize a contextual recommendation engine that identifies and provides avatar recommendations that are relevant to a particular extended-reality environment. For example, the context-aware universal avatar editing system can utilize data from an extended-reality environment (e.g., historical avatar appearances, environment themes, environment activities) with the contextual recommendation engine to predict avatar modifications that are relevant to a particular extended-reality environment. Furthermore, in some cases, the context-aware universal avatar editing system can further utilize user data with a social network graph (e.g., user activity, user affinities, historical user avatar selections) with the contextual recommendation engine to identify and provide avatar modifications that have a high affinity with the user in relation to the extended-reality environment. Indeed, the context-aware universal avatar editing system can display the contextually relevant avatar modifications within the context-aware avatar overlay editor to enable user selection and modification of an avatar to be relevant to the actively displayed extended-reality environment without navigating away from the extended-reality environment.

As an example, in one or more embodiments, a networking system can display an avatar within an extended-reality environment that represents an office space. Indeed, the networking system can display the user as an avatar within the office and, via the extended-reality device, provide a display of the extended-reality environment (e.g., office space) with co-users in the environment as co-avatars. Upon receiving a request from the user of the extended-reality device to modify the user's avatar, the context-aware universal avatar editing system can provide, for display as an overlay user interface in the extended-reality environment, a context-aware avatar overlay editor to modify an appearance of a user's avatar with avatar modifications that are relevant to an office space environment (e.g., business casual clothing, business casual hairstyles) while the extended-reality environment of the office space is running live in the background.

Subsequently, in relation to the example above, the networking system can receive a user interaction from the extended-reality device to switch (or move) to a subsequent extended-reality environment (e.g., corresponding to another application or another virtual location within the same application) that represents a concert venue. In response, the networking system can display the avatar of the user within the subsequent extended-reality environment and, via the extended-reality device, provide a display of the subsequent extended-reality environment (e.g., a concert venue) with co-users in the environment as co-avatars. Furthermore, upon receiving a request from the user of the subsequent extended-reality device to modify the user's avatar, the context-aware universal avatar editing system can provide, for display as an overlay user interface in the subsequent extended-reality environment, a context-aware avatar overlay editor to modify an appearance of a user's avatar with avatar modifications that are relevant to a concert venue environment (e.g., artist merchandise, hats, sunglasses, rock-inspired hairstyles) while the extended-reality environment of the concert venue is running live in the background.

The context-aware universal avatar editing system provides many technical advantages and benefits over conventional systems. For instance, the context-aware universal avatar editing system can flexibly and easily provide functionality to enable a number of visual changes to a system-based avatar without suspending or exiting the extended-reality environment. Indeed, in contrast to many conventional systems that are unable to access and modify an appearance of an avatar on-the-fly, the context-aware universal avatar editing system can provide applications presenting extended-reality environments an integrated avatar overlay editor data package that enables the applications to connect the user to an avatar editor within the application executing an extended-reality environment even when the avatar utilizes assets and/or functions from another application or system platform. Utilizing such an integrated avatar overlay within the extended-reality environment, the context-aware universal avatar editing system can enable easy and flexible modification of an avatar's appearance within the application executing an extended-reality environment without interrupting the extended-reality environment.

Additionally, unlike conventional extended reality systems that cannot provide tools or assets to accurately modify an appearance of an avatar to match an extended-reality environment, the context-aware universal avatar editing system can utilize a contextual recommendation engine with the integrated avatar overlay editor to identify and provide avatar modifications that are relevant to a particular extended-reality environment. In one or more instances, the context-aware universal avatar editing system leverages data from the extended-reality environment, user data, and/or a social network graph to identify and provide avatar assets that have a high affinity with the user in relation to the extended-reality environment and also match a theme (or setting) created by the extended-reality environment.

Furthermore, unlike rigid and inaccurate conventional systems that inefficiently require navigating back-and-forth between an extended-reality environment and an avatar editing environment to modify an avatar, the context-aware universal avatar editing system enables the applications to connect the user to an avatar editor within the application executing an extended-reality environment to modify an appearance of the avatar without suspending or exiting the extended-reality environment. In other words, the context-aware universal avatar editing system allow for editing of an avatar without requiring switching of applications from an extended-reality environment (even third-party applications). Consequently, the context-aware universal avatar editing system can increase the number of avatar modification requests that occur during changes in the extended-reality environment while remaining efficient by not utilizing resources to navigate between the extended-reality environment and an avatar editing environment. In addition, context-aware universal avatar editing system also improves the efficiencies of editing an avatar by enabling an application of an extended-reality environment to seamlessly overlay the avatar editor and (virtually instantly) modify the appearance of the avatar without the loading times associated with navigating to the native avatar editing application upon each request to modify the appearance of the avatar.

As illustrated by the foregoing discussion, the present disclosure utilizes a variety of terms to describe features and benefits of the context-aware universal avatar editing system. Additional detail is now provided regarding the meaning of these terms. For example, as used herein, the term "virtual environment" or "extended-reality environment" refers to a simulated environment in which users can fully or partially immerse themselves. For example, an extended-reality environment can comprise virtual reality, augmented reality, etc. An extended-reality environment can include objects and elements with which a user can interact. In general, a user participates in a virtual environment using a client device, such as a dedicated extended-reality device.

Additionally, as used herein, the term "extended-reality environment location" refers to a coordinate or position within an extended-reality environment. For instance, an extended-reality environment location can include a particular depiction of a region or theme (via visual elements) within the extended-reality environment. For example, an extended-reality environment location can include, but is not limited to, a virtual reality-based office room, a virtual reality-based concert venue, a virtual reality-based city, a virtual reality-based plaza, a virtual reality-based store, or a virtual reality-based location associated with an application (e.g., a poker table of a poker game, a golf course of a golfing game, etc.).

As used herein, the term "extended-reality device" refers to a computing device having extended reality capabilities and/or features. In particular, an extended-reality device can refer to a computing device that can display an extended reality graphical user interface. An extended-reality device can further display one or more visual elements within the extended reality graphical user interface and receive user input that targets those visual elements. For example, an extended-reality device can include, but is not limited to, a virtual reality device, an augmented reality device, or a mixed reality device. In particular, an extended-reality device can comprise a head-mounted display, a smartphone, or another computing device.

Additionally, as used herein, the term "extended reality graphical user interface" refers to a graphical user interface having extended reality capabilities and/or features. In particular, an extended reality graphical user interface can refer to a graphical user interface that provides an extended-reality environment within which one or more visual elements can be displayed. For example, an extended reality graphical user interface can include, but is not limited to, a user interface associated with a virtual reality environment, an augmented reality environment, or a mixed reality environment.

Further, as used herein, the term "visual element" refers to a graphical display element. In particular, a visual element can refer to a graphical display element displayed within a graphical user interface, such as an extended reality graphical user interface. A visual element can include a static display element or an animated display element. Further, a visual element can include an interactable display element—where a computing device displaying the visual element reacts or is caused to react in response to a user input that targets the visual element. Examples of a visual element include, but are not limited to, a digital image, text, an icon, a symbol, a notification or other graphical indicator, an animated visual representation of a user or a non-user construct (as an avatar), a thumbnail image or other representation of a digital object, a display area, or an extended-reality environment scene. In one or more embodiments, the context-aware universal avatar editing system can display one or more visual elements within another visual display element.

Additionally, as used herein, the term "animated visual representation" refers to an animated visual element. In particular, an animated visual representation can refer to a visual element that represents a real-world object, entity, or idea and can move or be caused to move within a display area. For example, an animated visual representation can include an animated visual element representing a user of a networking system, such as an animated avatar, bot, or caricature.

As mentioned above, a visual element can include an avatar. As used herein, the term "avatar" (sometimes referred to as a "digital avatar") refers to a visually human-like (e.g., anthropomorphic), three-dimensional representation (or persona) of a user within an extended-reality environment. As an example, an avatar can include a three-dimensional representation of a user that provides a realistic (e.g., accurate, life-like, and/or photorealistic) portrayal of the user within the extended-reality environment. Additionally, an avatar can also include a three-dimensional representation of a user that provides a simplified (e.g., animated, caricature-like, cartoon-like) portrayal of the user within the extended-reality environment.

In one or more implementations, the context-aware universal avatar editing system can modify an appearance of an avatar utilizing various graphical assets. As used herein, the term "graphical assets" refers to graphical skins (or graphical articles), graphical structures, and/or other visual elements of an avatar. As an example, graphical assets can include (as graphical skins or articles), but is not limited to, various avatar clothing elements (e.g., tops, bottoms, dresses), various avatar accessories (eyewear, headwear, jewelry, watches, bracelets, shoes, bags), and/or other items (e.g., vehicles, staffs, swords, capes). Furthermore, graphical assets can include (as graphical skins), but is not limited to, various avatar hair styles, avatar hair colors, avatar skin types, avatar skin colors, avatar skin textures or characteristics (e.g., freckles, wrinkles, makeup, tattoos), avatar eye colors, avatar eye styles, and/or avatar facial hair styles (e.g., eyebrows, moustaches, beards). Additionally, graphical assets can include (as graphical structures), but is not limited to, various avatar body types (height, weight, build), avatar eye positions, avatar nose positions (and sizes), avatar ear positions, and/or avatar face sizes.

As further used herein, the term "contextual recommendation engine" refers to a computer-based model that determines avatar appearances or graphical assets for an avatar that correspond to an extended-reality environment and/or a user. In particular, the term "contextual recommendation engine" refers to a computer-based model that utilizes characteristics (or data) of an extended-reality environment, characteristics (or data) of a user, and/or a social network graph to identify (or rank) relevant avatar appearances or graphical assets recommendations to display within an avatar editor. In some instances, the context-aware universal avatar editing system utilizes a contextual recommendation engine that models historical selections (e.g., historical user avatar trends, historical user selections, contextual tags) and/or a machine learning model that utilizes input characteristics (or data) of an extended-reality environment, characteristics (or data) of a user, and/or a social network graph to output avatar appearance or graphical asset recommendations (and/or contextual tags that can be used to reference avatar appearance or graphical asset recommendations).

As used herein, the term "machine learning model" refers to a computer-based model that can be trained (e.g., tuned or learned) based on inputs to approximate unknown functions and corresponding outputs. As an example, a machine learning model can include, but is not limited to, a neural network (e.g., a convolutional neural network, recurrent neural network, or deep learning model), a decision tree (e.g., a gradient boosted decision tree, a random forest decision tree), a generative adversarial neural network, and/or a regression model.

Furthermore, as used herein, the term "contextual tag" refers to a label that categorizes a graphical asset of an avatar to an extended-reality environment and/or a user characteristic. For instance, a graphical asset of an avatar can include one or more contextual tags as descriptors that indicate characteristics that are relevant to the graphical asset. Moreover, an extended-reality environment and/or a user can also include one or more contextual tags as descriptors that indicate characteristics of the extended-reality environment and/or user.

As an example, the context-aware universal avatar editing system can assign a contextual tag of "cooking" to a graphical asset representing an apron. In addition, the context-aware universal avatar editing system can assign the contextual tag of "cooking" to an extended-reality environment representing a kitchen. In some cases, the context-aware universal avatar editing system identify the graphical asset representing the apron as a relevant avatar customization option within a context-aware avatar overlay editor when an avatar of the user is present within the extended-reality environment representing the kitchen. In one or more embodiments, contextual tags include various labels (as nouns, verbs, adjectives) to represent places, objects, persons, themes, motives, actions, size, color, and/or professions.

Additionally, as used herein, the term "avatar editor" refers to a graphical interface having a collection of selectable tools or functionalities that modify an appearance of an avatar. In particular, an avatar editor can include selectable (or adjustable) graphical assets for an avatar (e.g., contextually recommended graphical assets). In addition, an avatar editor can include a preview of an avatar that previews an appearance of the avatar utilizing selected (or adjustments to) graphical assets presented within the avatar editor.

As used herein, the term "context-aware avatar overlay editor" refers to an avatar editor that overlays (as an integrated interface) within an extended-reality environment graphical user interface without pausing, suspending, or exiting an extended-reality environment. In addition, the term "context-aware avatar overlay editor" refers to an avatar editor that presents (or includes) graphical assets for avatar customizations determined by a contextual recommendation engine. Indeed, the context-aware universal avatar editing system generates, for display to a user via an extended-reality device, a context-aware avatar overlay editor within an active extended-reality environment to modify an avatar without suspending or exiting the extended-reality environment in accordance with one or more implementations herein.

Additionally, as used herein, the term "integrated avatar overlay editor data package" refers to a collection of data (or instructions) that integrates a context-aware avatar overlay editor within an application executing (or presenting) an extended-reality environment. As an example, an integrated avatar overlay editor data package can include development tools, such as source code, code libraries, compilers, application programing interfaces (APIs), data assets that enables an application (or application administrator) to integrate a context-aware avatar overlay editor (e.g., that can communicate with the context-aware universal editing system) within an application executing (or presenting) an extended-reality environment. As an example, an integrated avatar overlay editor data package can include a software development kit (SDK) that includes development tools that integrate a context-aware avatar overlay editor within an application executing (or presenting) an extended-reality environment.

Additional detail regarding the context-aware universal avatar editing system will now be provided with reference to the figures. For example, FIG. 1 illustrates a schematic diagram of an exemplary system environment ("environment") 100 in which a context-aware universal avatar editing system 106 can be implemented. As illustrated in FIG. 1, the environment 100 includes a server device(s) 102 (sometimes referred to as server(s)), a network 108, client devices 110a-110n, and a third-party server 114.

Although the environment 100 of FIG. 1 is depicted as having a particular number of components, the environment 100 can have any number of additional or alternative components (e.g., any number of server devices, client devices, and/or third-party servers in communication with the context-aware universal avatar editing system 106 either directly or via the network 108). Similarly, although FIG. 1 illustrates a particular arrangement of the server device(s) 102, the network 108, the client devices 110a-110n, and the third-party server 114, various additional arrangements are possible.

The server device(s) 102, the network 108, the client devices 110a-110n, and the third-party server 114 may be communicatively coupled with each other either directly or indirectly (e.g., through the network 108 discussed in greater detail below in relation to FIGS. 11 and 12). Moreover, the server device(s) 102 and the client devices 110a-110n may include a variety of computing devices (including one or more computing devices as discussed in greater detail with relation to FIG. 10).

As mentioned above, the system 100 includes the server device(s) 102. The server device(s) 102 can generate, store, receive, and/or transmit data including communications data. For example, the server device(s) 102 can receive user input from a client device (e.g., one of the client devices 110a-110n) and transmit the communication to another client device. In one or more embodiments, the server device(s) 102 comprises a data server. The server device(s) 102 can also comprise a communication server or a web-hosting server.

As shown in FIG. 1, the server device(s) 102 includes a networking system 104. In particular, the networking system 104 can provide a digital platform (e.g., an extended-reality platform) that includes functionality through which users of the networking system 104 can connect to and/or interact with one another. For example, the networking system 104 can register a user (e.g., a user of one of the client devices 110a-110n). The networking system 104 can further provide features through which the user can connect to and/or interact with co-users. For example, the networking system 104 can provide messaging features and/or chat features through which a user can communicate with one or more co-users. The networking system 104 can also generate and provide groups and communities through which the user can associate with co-users.

In one or more embodiments, the networking system 104 comprises a social networking system, but in other embodiments the networking system 104 may comprise another type of system, including but not limited to an e-mail system, search engine system, e-commerce system, banking system, metaverse system or any number of other system types that use user accounts. For example, in some implementations, the networking system 104 generates and/or obtains data for an extended-reality device (e.g., client devices 110a-110n via the server device(s) 102). Furthermore, the networking system 104 can provide and/or generate virtual reality elements (e.g., graphics, audio, video, other sensory input) related to an extended-reality environment (e.g., virtual concerts, virtual immersive video games, virtual social meetups) in the extended-reality device. Additionally, the networking system 104 can manage user actions of one or more users within an extended-reality environment by receiving information (e.g., interactions, movements, communications) from one or more extended-reality devices operated by the one or more users (e.g., the client devices 110a-110n via the server device(s) 102).

In one or more embodiments where the networking system 104 comprises a social networking system, the networking system 104 may include a social graph system for representing and analyzing a plurality of users and concepts. A node storage of the social graph system can store node information comprising nodes for users, nodes for concepts, and nodes for items. An edge storage of the social graph system can store edge information comprising relationships between nodes and/or actions occurring within the social networking system. Further detail regarding social networking systems, social graphs, edges, and nodes is presented below with respect to FIGS. 11 and 12.

As further shown in FIG. 1, the server device(s) 102 includes the context-aware universal avatar editing system 106. In one or more embodiments, the context-aware universal avatar editing system 106 provides an integrated avatar overlay editor within an application corresponding to the extended-reality environment. In addition, through the integrated avatar overlay editor, the context-aware universal avatar editing system 106 can provide, for display as an overlay user interface in the extended-reality environment within an extended-reality device (e.g., client devices 110a-110n), a context-aware avatar overlay editor to modify an appearance of a user's avatar without suspending or exiting the extended-reality environment.

Additionally, as shown in FIG. 1, the environment 100 includes the client devices 110a-110n. For instance, the client devices 110a-110n can include computing devices (as extended-reality devices) that can facilitate communication between users of a networking system via an extended-reality environment. For example, the client devices 110a-110n can include head-mounted display devices (including those capable of providing an extended reality display), smartphones, tablets, desktop computers, laptop computers, or other electronic devices having extended reality capabilities.

Additionally, the client devices 110a-110n can include one or more applications (e.g., the client applications 112a-112n) that can facilitate communication between users of a networking system via an extended-reality environment. For example, the client applications 112a-112n can include a software application installed on the client devices 110a-110n. Additionally, or alternatively, the client applications 114a-114n can include a software application hosted on the server device(s) 102, which may be accessed by the client devices 110a-110n through another application, such as a web browser. Furthermore, in some embodiments, each of the client devices 110n-110n is associated with one or more user accounts of a social networking system (e.g., as described in relation to FIGS. 11 and 12).

Moreover, as shown in FIG. 1, the environment 100 includes the third-party server 114. For instance, the third-party server 114 can generate, store, receive, and/or transmit data including communications data. In addition, the third-party server 114 can receive user input from a client device (e.g., one of the client devices 110a-110n) and transmit the communication to another client device. In one or more embodiments, the third-party server 114 comprises a data server of a third-party entity (e.g., an application development entity, software development entity, a data storage entity). The third-party server 114 can also comprise a communication server or a web-hosting server. In some instances, the third-party server 114 can facilitate an implementation of an extended-reality environment within one of the client devices 110a-110n and/or facilitate user interactions (or communications) between users in an extended-reality environment.

As an example, and as shown in FIG. 1, the third-party server 114 includes a third-party application 116. For instance, the third-party application can include a software application that is downloadable and installable on one or more of the client devices 110a-110n. Indeed, the third-party application can, in some cases, include a software application hosted on the third-party server 114, which may be accessed by the client devices 110a-110n through another application, such as a web browser. In one or more embodiments, the third-party application 116 can include a software application that implements and executes an extended-reality environment experience within one or more of the client devices 110a-110n. In some cases, the context-aware universal avatar editing system 106 can provide an overlay avatar editor data package (as an SDK) to be integrated within the third-party application 116 such that a context-aware avatar overlay editor can be displayed within the extended-reality environment of the third-party application 116 within one or more of the client devices 110a-110n. In some cases, the networking system 104 can provide access to the third-party application 116 of the third-party server 114 via an application library (or application store) hosted on the server device(s) 102.

The context-aware universal avatar editing system 106 can be implemented in whole, or in part, by the individual elements of the environment 100. Indeed, although FIG. 1 illustrates the context-aware universal avatar editing system 106 implemented with regard to the server device(s) 102, different components of the context-aware universal avatar editing system 106 can be implemented by a variety of devices within the environment 100. For example, one or more (or all) components of the context-aware universal avatar editing system 106 can be implemented by a different computing device (e.g., one of the client devices 110a-110n) or a separate server from the server device(s) 102.

As mentioned above, the context-aware universal avatar editing system 106 can generate, for display to a user via an extended-reality device, a context-aware avatar overlay editor within an active extended-reality environment to modify an avatar without suspending or exiting the extended-reality environment. For example, an application can display, via an extended-reality device, an extended-reality environment in which a user of the extended-reality device and co-users exist and communicate. Within the extended-reality environment, the application (via the networking system 104) can represent and display the users as avatars. In some implementations, the application executing the extended-reality environment is integrated with an overlay avatar editor data package from the context-aware universal avatar editing system 106 to enable the context-aware universal avatar editing system 106 to generate, for display to a user via the extended-reality device, a context-aware avatar overlay editor within the extended-reality environment of the application.

Figure 2:
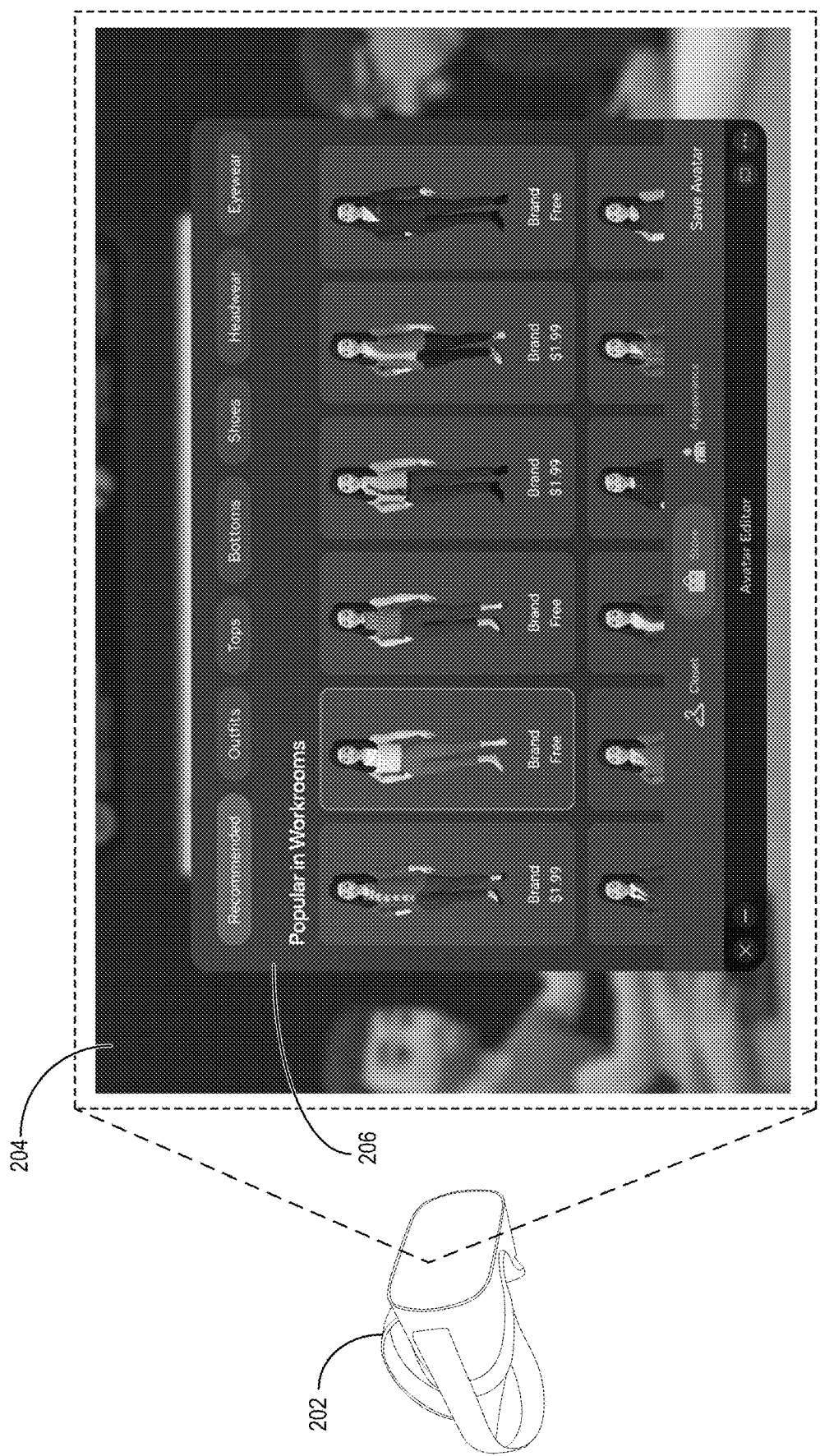
FIG. 2 illustrates an example of a context-aware universal avatar editing system displaying a context-aware avatar overlay editor within an active extended-reality environment in accordance with one or more implementations.

For example, FIG. 2 illustrates a context-aware universal avatar editing system 106 displaying, via an extended-reality device, a context-aware avatar overlay editor within an extended-reality environment. As shown in FIG. 2, a client device 202 (e.g., an extended-reality device) displays an extended-reality environment 204 in which a user wearing the client device 202 is represented by, and controls, an avatar. In other words, the client device 202 can provide the user a view of the extended-reality environment 204 from the point of view of an avatar.

Furthermore, as shown in FIG. 2, upon receiving a user selection to request a modification of an appearance of an avatar within an extended-reality environment 204 (e.g., an extended-reality environment representing an office meeting), the context-aware universal avatar editing system 106 displays a context-aware avatar overlay editor 206. As further shown in FIG. 2, the context-aware universal avatar editing system 106 displays the context-aware avatar overlay editor 206 while the extended-reality environment 204 continues to operate and function (e.g., without suspension or exiting). In other implementations, extended-reality environment 204 pauses while changes are being made to an avatar. Indeed, in reference to FIG. 2, the context-aware universal avatar editing system 106 can receive various selections within the context-aware avatar overlay editor 206 to customize an appearance of an avatar (e.g., with context-based graphical assets related to office wear, other graphical assets based on the extended-reality environment, and/or other graphical assets for the avatar) within the extended-reality environment 204 in accordance with one or more implementations herein.

In some cases, the context-aware universal avatar editing system 106 displays a context-aware avatar overlay editor as a visual element within an extended-reality environment. For instance, the context-aware universal avatar editing system 106 can display the context-aware avatar overlay editor within an object portrayed in the extended-reality environment that is interacted with by a user operating a client device (e.g., an extended-reality device). For instance, the context-aware universal avatar editing system 106 can display the context-aware avatar overlay editor within visual elements, such as a virtual tablet, virtual mirror, and/or virtual mobile device present in the extended-reality environment.

As an example of the context-aware universal avatar editing system 106 displaying the context-aware avatar overlay editor as a visual element within an extended-reality environment. As shown, the context-aware universal avatar editing system 106 can display the context-aware avatar overlay editor as an overlay. In alternative implementations, the context-aware universal avatar editing system 106 can display the context-aware avatar overlay editor within a virtual computing device (e.g., a virtual tablet) in an extended-reality environment representing a virtual office space. In some cases, the extended-reality environment representing the virtual office space can present, within the extended-reality device, avatars of co-users meeting within the virtual office space. The context-aware universal avatar editing system 106 can display the context-aware avatar overlay editor to enable modifications to an avatar of the user on the virtual computing device (e.g., a virtual tablet) while the extended-reality device presents the co-users meeting within the virtual office space (in real time).

Figure 3:
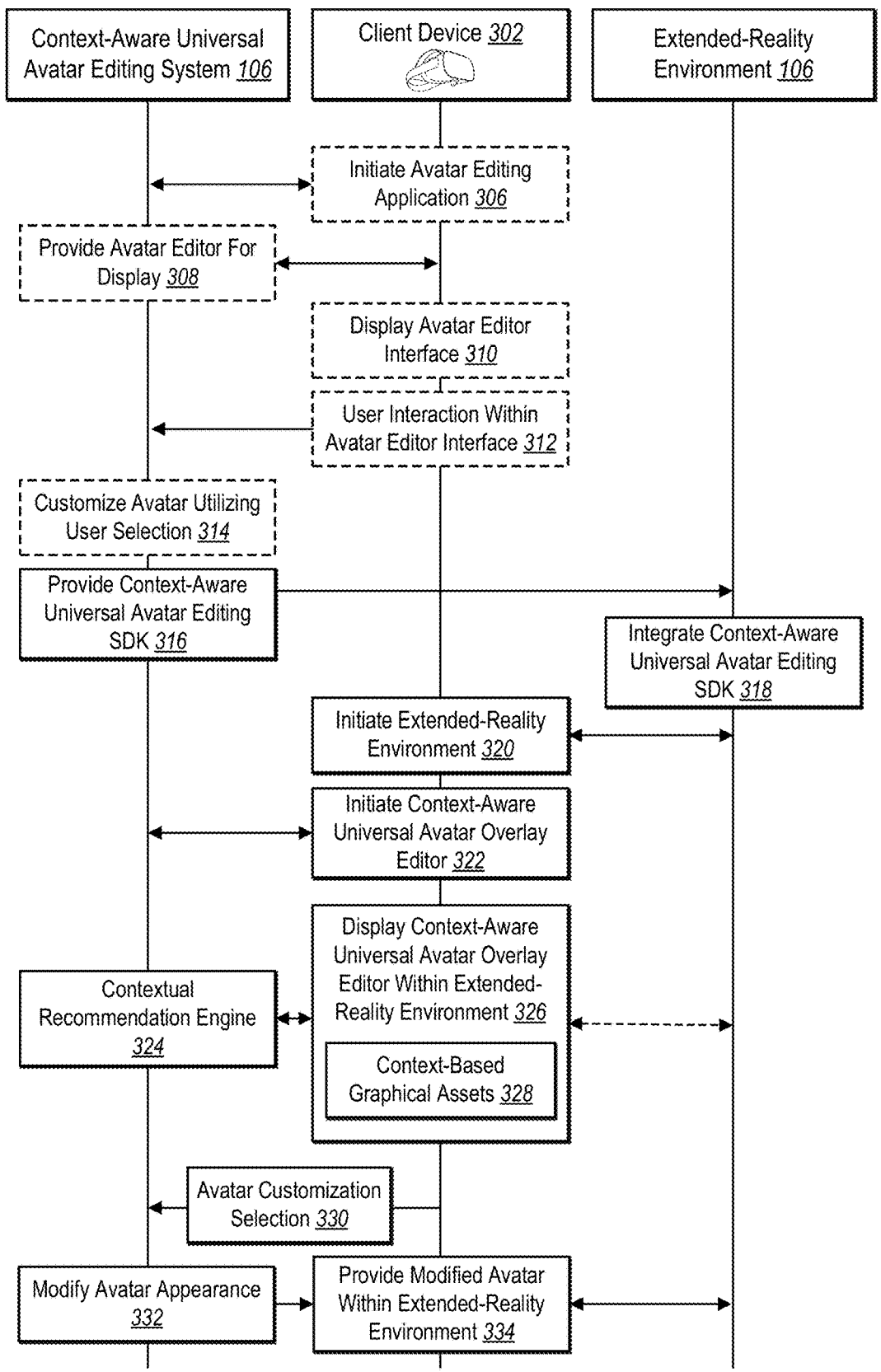
FIG. 3 illustrates a sequence diagram of a context-aware universal avatar editing system displaying a context-aware avatar overlay editor in accordance with one or more implementations.

Additionally, FIG. 3 illustrates a flow diagram of the context-aware universal avatar editing system 106 enabling the display of a context-aware avatar overlay editor within an extended-reality environment. In particular, FIG. 3 illustrates the context-aware universal avatar editing system 106 providing a context-aware avatar editor to initialize and/or customize an avatar prior to initializing a particular extended-reality environment experience on an extended-reality device of a user. Additionally, FIG. 3 also illustrates the context-aware universal avatar editing system 106 displaying and utilizing an integrated context-aware overlay editor with context-aware avatar modifications while actively executing (or running) an extended-reality environment (e.g., an extended-reality environment scene continues to render, co-users within an extended-reality environment scene remain active and/or communicate, an event within an extended-reality environment continues in real time).

As shown in act 306 of FIG. 3, in some instances, the client device 302 (e.g., an extended-reality device) initiates an avatar editing application (e.g., outside of and/or prior to launching an extended-reality environment 320). Upon initiating the avatar editing application, the context-aware universal avatar editing system 106, in act 308 of FIG. 3, provides, for display on the client device 302, an avatar editor. Additionally, as shown in act 310 of FIG. 3, the client device 302 displays an avatar editor interface to set up or modify an appearance of an avatar corresponding to a user of the client device 302. Indeed, as further shown in act 312 of FIG. 3, the client device 302 detects and transmits user interactions within the avatar editor interface to the context-aware universal avatar editing system 106. Moreover, as shown in act 314 of FIG. 3, the context-aware universal avatar editing system 106 utilizes the user selections to create and/or customize the avatar (e.g., modify the appearance of the avatar corresponding to the client device 302).

In one or more embodiments, when initiating and displaying an avatar editing application outside of and/or prior to launching an extended-reality environment, the context-aware universal avatar editing system 106 can provide the avatar editor within an extended-reality environment that is specific for the avatar editor. Indeed, the context-aware universal avatar editing system 106 can display the avatar editor within a user home extended-reality environment or a setup environment that includes the avatar editor as a native application. Indeed, the context-aware universal avatar editing system 106 can provide the avatar editor in an application that is specific for customizing and/or setting up the avatar for the user. Additionally, in one or more embodiments, the context-aware universal avatar editing system 106 provides context-based graphical assets that are relevant to the user within the avatar editor utilizing a contextual recommendation engine as described in greater detail below (e.g., in relation to FIGS. 5A and 5B).

As further shown in act 316 of FIG. 3, the context-aware universal avatar editing system 106 provides a context-aware universal avatar editing SDK to the extended-reality environment 106 (to integrate the context-aware universal avatar editor into the extended-reality environment 106). Indeed, as shown in act 318 of FIG. 3, the extended-reality environment 106 (or an application of the extended-reality environment 106) receives the context-aware universal avatar editing SDK and integrates the context-aware universal avatar overlay editor within the application executing the extended-reality environment 106. Indeed, the context-aware universal avatar editing system 106 integrating a context-aware universal avatar overlay editor within an extended-reality environment is described below (e.g., in reference to FIG. 4).

Additionally, as shown in act 320 of FIG. 3, the client device 302 receives an indication to initiate the extended-reality environment 106. Indeed, the extended-reality environment 106 launches on the client device 302 to display, within the client device 302, an immersive extended-reality environment that places a user corresponding to the client device 302 (e.g., as an avatar) to interact with co-users (as avatars) or other visual elements in the immersive extended-reality environment. For example, the extended-reality environment 106 can launch and display within the client device 302 via an application that implements the extended-reality environment 106 (e.g., an application that is different from the application that implements the context-aware universal avatar editing system 106).

Furthermore, as shown in act 322 of FIG. 3, the client device 302 receives an indication to initiate a context-aware universal avatar overlay editor. Indeed, as shown in the act 322 of FIG. 3, through the integration of the context-aware universal editor in the act 318 in the extended-reality environment 106, the client device 302 communicates with the context-aware universal avatar editing system 106 upon initiating the context-aware universal avatar overlay editor. As also shown in act 326 of FIG. 3, the context-aware universal avatar editing system 106 provides context-based graphical assets 328 to the client device 302 and causes the client device 302 to display a context-aware universal avatar overlay editor within the extended-reality environment 106. Indeed, the context-aware universal avatar editing system 106 can cause the client device 302 to display a context-aware universal avatar overlay editor as described below (e.g., in relation to FIGS. 4, 5A-5B, and 6A-6B).

Additionally, as shown in FIG. 3, the context-aware universal avatar editing system 106 utilizes a contextual recommendation engine 324 to determine context-based graphical assets 328. In some embodiments, as part of displaying the context-aware universal avatar overlay editor, the context-aware universal avatar editing system 106 utilizes a contextual recommendation engine 324 to select context-based graphical assets 328 that are relevant to the extended-reality environment and/or a user corresponding to the client device 302. Indeed, the context-aware universal avatar editing system 106 can utilize a contextual recommendation engine as described below (e.g., in relation to FIGS. 5A-5B and 6A-6B).

Moreover, as shown in FIG. 3, the context-aware universal avatar editing system 106 receives avatar customization selections 330 from the client device 302 (from within the context-aware universal avatar overlay editor). Upon receiving the avatar customization selections 330 from the client device 302, the context-aware universal avatar editing system 106 (in act 332) modifies an appearance of the avatar based on the avatar customization selections 330. Subsequently, as shown in act 334 of FIG. 3, the client device 102 (or the extended-reality environment 106) provides the modified avatar within the extended-reality environment 106. Indeed, the modified avatar is displayed within the extended-reality environment 106 to represent the user corresponding to the client device 302 by the client device 302 and one or more client devices of one or more co-users.

Figure 4:
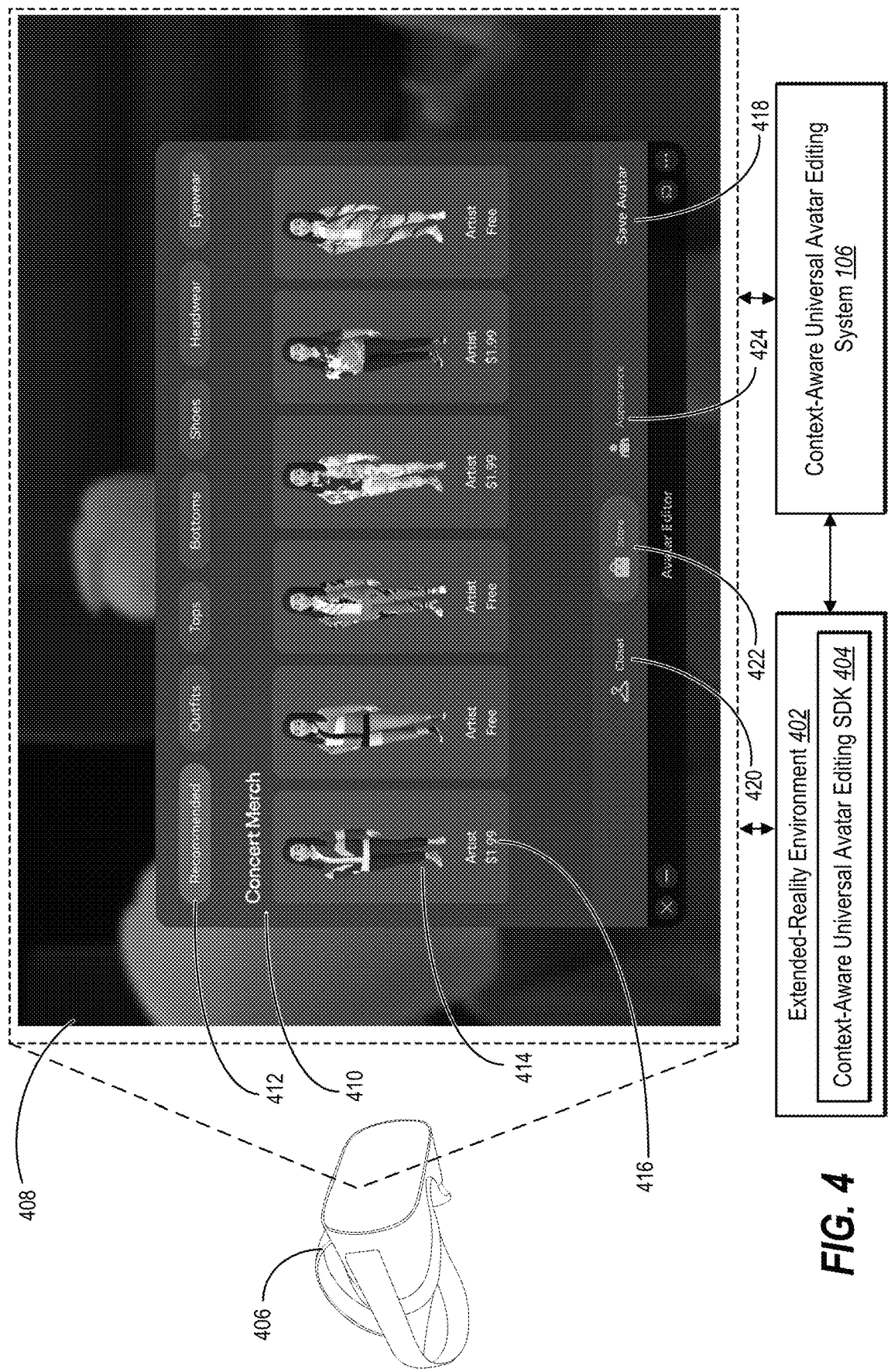
FIG. 4 illustrates a context-aware universal avatar editing system integrating and displaying a context-aware avatar overlay editor within an extended-reality environment in accordance with one or more implementations.

As previously mentioned, the context-aware universal avatar editing system 106 can generate, for display to a user via an extended-reality device, a context-aware avatar overlay editor within an active extended-reality environment to modify an avatar without suspending or exiting the extended-reality environment. For example, FIG. 4 illustrates the context-aware universal avatar editing system 106 integrating a context-aware avatar overlay editor within an extended-reality environment. In particular, FIG. 4 illustrates the context-aware universal avatar editing system 106 integrating a context-aware avatar overlay editor and functionalities of the context-aware avatar overlay editor.

For instance, as shown in FIG. 4, the context-aware universal avatar editing system 106 provides a context-aware universal avatar editing SDK 404 (as a context-aware universal avatar editing data package) to an extended-reality environment 402 (or an application executing the extended-reality environment 402). In one or more embodiments, context-aware universal avatar editing system 106 provides the context-aware universal avatar editing SDK 404 to implement functionalities within the extended-reality environment 402 (e.g., via integration of source code from the SDK with an application executing the extended-reality environment 402). Indeed, the context-aware universal avatar editing SDK 404 can include source code, code libraries, and/or assets to integrate and cause an extended-reality environment to display a context-aware avatar overlay editor that communicates with the context-aware universal avatar editing system 106 without suspending or pausing a displayed extended-reality environment user interface 408 from the extended-reality environment 402.

In some implementations, the context-aware universal avatar editing system 106 is implemented within an application of the extended-reality environment (through a context-aware universal avatar editing SDK). Indeed, the context-aware universal avatar editing system 106 can be implemented within an application of the extended-reality environment such that the context-aware universal avatar editing system 106 communicates with the networking system 104 (or an operating system of an extended-reality device) to access and modify an avatar (e.g., synchronizes the avatar across the networking system 104 or the operating system) without exiting or suspending the extended-reality environment executed by the application. In particular, the context-aware universal avatar editing system 106 can be implemented within an application executing the extended-reality environment to operate as an overlaying (or concurrent) task that displays the context-aware avatar overlay editor while the extended-reality environment is actively operating (or running).

In one or more instances, the context-aware universal avatar editing system 106 provides a context-aware universal avatar editing SDK (as a context-aware universal avatar editing data package) to an extended-reality environment to enable the extended-reality environment to communicate with the context-aware universal avatar editing system 106. In particular, the extended-reality environment (or an application executing the extended-reality environment) can communicate with the context-aware universal avatar editing system 106 to overlay the context-aware avatar overlay editor and receive user selections for avatar modification. Indeed, the context-aware universal avatar editing system 106 can enable an extended-reality environment to provide various functionalities for modifying an avatar through the context-aware avatar overlay editor.

As mentioned above, the context-aware universal avatar editing system 106 can provide various functionalities to modify an appearance of an avatar through a context-aware avatar overlay editor without exiting or suspending an extended-reality environment. For example, FIG. 4 illustrates the context-aware universal avatar editing system 106 communicating with the extended-reality environment 402 to display, within an extended-reality environment user interface 408 in a client device 406 (e.g., an extended-reality device), a context-aware avatar overlay editor 410. Indeed, the context-aware universal avatar editing system 106 can receive user selections from within the context-aware avatar overlay editor 410 and utilize the user selections to modify an appearance of the avatar without exiting or suspending the extended-reality environment user interface 408. In one or more embodiments, the context-aware universal avatar editing system 106 provides, for display within the context-aware avatar overlay editor 410, various graphical assets from an avatar graphical asset repository.

As part of the context-aware avatar overlay editor 410, as shown in FIG. 4, the context-aware universal avatar editing system 106 provides category tabs 412 for different categories of avatar customization. For example, as shown in FIG. 4, the category tabs 412 includes a recommended tab. In one or more embodiments, the context-aware universal avatar editing system 106, under the recommended tab, can provide one or more context-based graphical assets determined utilizing a contextual recommendation engine for the extended-reality environment.

In addition, as shown in FIG. 4, the context-aware universal avatar editing system 106, under the category tabs 412, can include categories such as outfits (e.g., a collection or grouping of avatar graphical assets that create a particular style, such as a selected top, bottom, and shoe for an avatar), tops (e.g., graphical assets that modify a top portion of an avatar, such as shirts and/or jackets), bottoms (e.g., graphical assets that modify a bottom portion of an avatar, such as pants, shorts, and/or skirts), shoes, headwear, and eyewear. Indeed, the context-aware universal avatar editing system 106 can include category tabs for various groupings of graphical assets for an avatar.

As further shown in FIG. 4, the context-aware universal avatar editing system 106 provides, for display within the context-aware avatar overlay editor 410, a selectable graphical asset 414 for an avatar corresponding to a user of the client device 406. As shown in FIG. 4, the context-aware universal avatar editing system 106 displays the selectable graphical asset 414 (e.g., a recommended outfit for an extended-reality environment representing a concert venue) directly on the avatar as a preview. Upon receiving a selection of the selectable graphical asset 414, in one or more embodiments, the context-aware universal avatar editing system 106 applies the outfit on the avatar to display the avatar with the selected graphical asset within the extended-reality environment 402 (e.g., upon receiving a request to save the avatar via the selectable option 418).

In an alternate or additional embodiments, the context-aware universal avatar editing system 106 can provide, for display within a context-aware avatar overlay editor, a separate avatar preview. In particular, the context-aware universal avatar editing system 106 can modify the avatar preview upon receiving a selection of a graphical asset within the context-aware avatar overlay editor to display the avatar with the selected graphical asset. For instance, the context-aware universal avatar editing system 106 can provide, for display within a context-aware avatar overlay editor, an avatar preview that can preview an appearance of an avatar with one or more selected graphical assets from the context-aware avatar overlay editor.

As further shown in FIG. 4, the context-aware universal avatar editing system 106 provides, for display within the context-aware avatar overlay editor 410, a selectable closet feature 420. For example, in one or more embodiments, upon receiving a selection of the selectable closet feature 420, the context-aware universal avatar editing system 106 provides, within the context-aware avatar overlay editor 410, one or more graphical assets for an avatar that correspond to a user account associated with the user of the client device 406. In particular, the one or more graphical assets that correspond to the user account can include user owned graphical assets (e.g., via purchase or download from one or more extended-reality environment applications). In some cases, the context-aware universal avatar editing system 106 can also provide, within the context-aware avatar overlay editor 410, one or more saved outfits (or combinations) of graphical assets by the user account (e.g., historically selected graphical assets, created and saved combinations of graphical assets, favorited graphical assets).

As further shown in FIG. 4, the context-aware universal avatar editing system 106 provides, for display within the context-aware avatar overlay editor 410, a selectable store feature 422. For example, in one or more instances (and as shown in FIG. 4), the context-aware universal avatar editing system 106 can facilitate the purchase of graphical assets for an avatar within the context-aware avatar overlay editor 410. As shown in FIG. 4, the context-aware universal avatar editing system 106 can provide, for display within the context-aware avatar overlay editor 410, a purchase price 416 for the selectable graphical asset 414. In some cases, upon receiving a selection of the selectable graphical asset 414 from the client device 406, the context-aware universal avatar editing system 106 can facilitate a payment for the selectable graphical asset 414 from the user of the client device 406 (e.g., through a payment information request or through a saved autopayment option).

In addition, the context-aware universal avatar editing system 106 can also utilize a contextual recommendation engine to provide one or more relevant graphical assets (e.g., context-based graphical assets) within the context-aware avatar overlay editor 410 upon receiving a selection of the selectable store feature 422. In some cases, the context-aware universal avatar editing system 106 utilizes the contextual recommendation engine to determine a likelihood of the user of the client device 406 purchasing particular graphical assets to surface the graphical assets for purchase. In particular, the context-aware universal avatar editing system 106 can surface graphical assets that are likely to be purchased by the user (e.g., via ranking of likelihoods or utilizing a threshold probability).

As also shown in FIG. 4, the context-aware universal avatar editing system 106 also provides, for display within the context-aware avatar overlay editor 410, an avatar appearance modifier option 424. For example, upon receiving a selection of the avatar appearance modifier option 424 from the client device 406, the context-aware universal avatar editing system 106 can provide, for display within the context-aware avatar overlay editor 410, options to modify various features of an avatar. For example, the context-aware universal avatar editing system 106 can provide, for display within the context-aware avatar overlay editor 410, options to modify graphical assets of the avatar, such as, but not limited to, hairstyles, hair color, face styles, skin tones, body types, and/or height.

In one or more embodiments, upon receiving a selection of the selectable option 418 to save an avatar, the context-aware universal avatar editing system 106 can universally utilize the modified appearance of the avatar throughout multiple applications that execute various extended-reality environments. In addition, the context-aware universal avatar editing system 106 can also universally utilize the modified appearance of the avatar within other two-dimensional profile avatars (e.g., within a messenger application, a social network profile) and/or other augmented reality scenes (e.g., through a camera feed of a mobile device or through a head-mounted display). Furthermore, upon receiving a selection of the selectable option 418 to save an avatar, the context-aware universal avatar editing system 106 can also provide the modified avatar for display within the extended-reality environment 402 (e.g., via the extended-reality environment user interface 408) such that the user of the client device 406 and other co-users within the extended-reality environment can view the updated appearance of the avatar.

Moreover, as mentioned above, an extended-reality environment can continue to operate while the context-aware universal avatar editing system 106 displays the context-aware avatar overlay editor. As such, the extended-reality environment can enable other co-users via other extended-reality devices to continue to interact in the extended-reality environment while the user (e.g., corresponding to the client device 406) changes an avatar within a context-aware avatar overlay editor (e.g., the context-aware avatar overlay editor 410). By doing so, the context-aware universal avatar editing system 106 enables modification of an appearance of an avatar frequently without suspending or leaving an extended-reality environment. Additionally, as shown in FIG. 4, the context-aware universal avatar editing system 106 utilizes a contextual recommendation engine that surfaces relevant avatar modifications that reduce the amount of searching and navigation required within the context-aware avatar overlay editor to identify relevant graphical assets for the extended-reality environment.

Figure 5A:
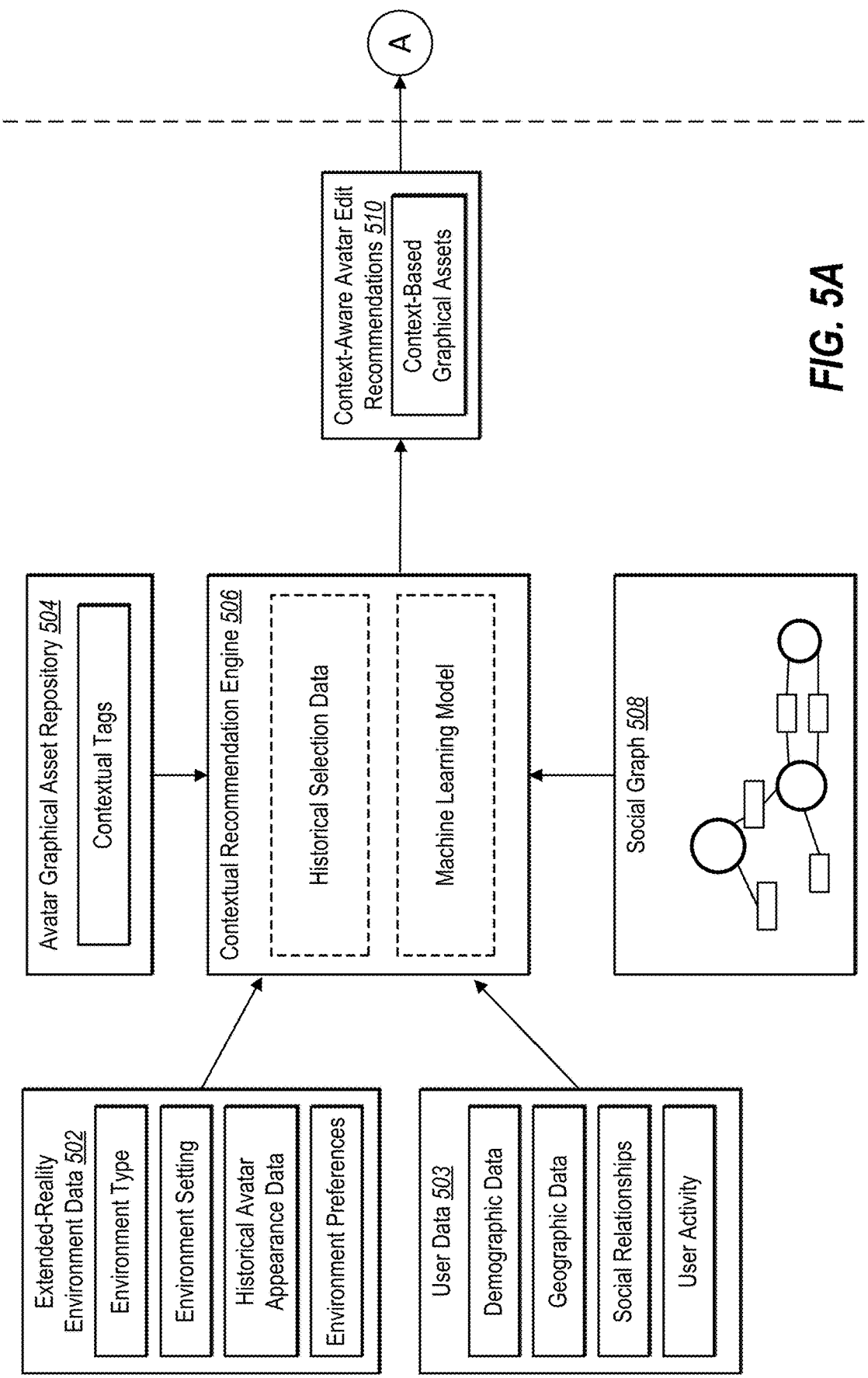
FIGS. 5A and 5B illustrate a context-aware universal avatar editing system utilizing a contextual recommendation engine to determine recommended avatar edits within a context-aware avatar overlay editor in accordance with one or more implementations.
Figure 5B:
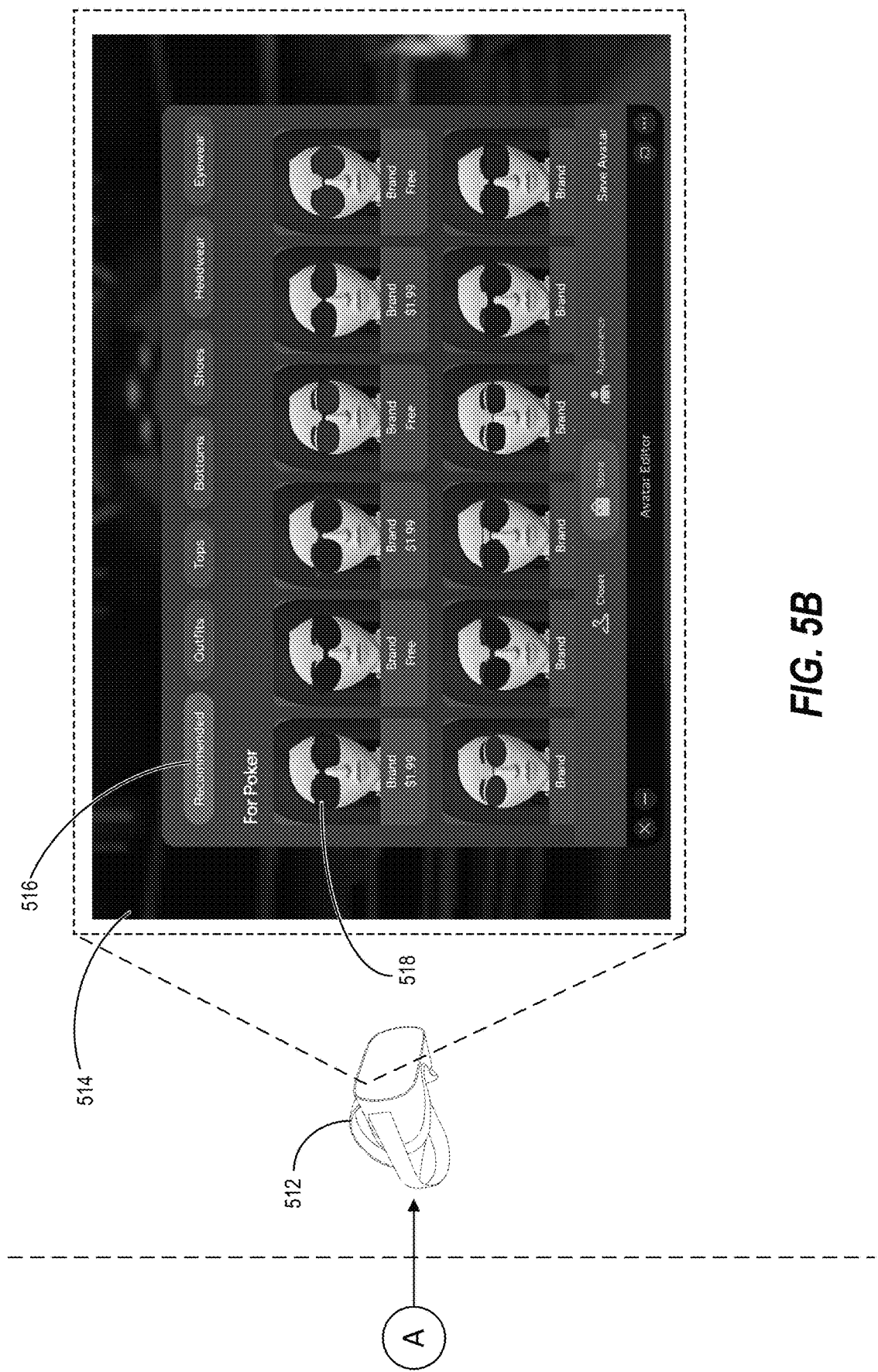

As mentioned above, in one or more embodiments, the context-aware universal avatar editing system 106 utilizes a contextual recommendation engine to determine relevant graphical assets for modifying an avatar in a context-aware avatar overlay editor. For example, FIGS. 5A-5B illustrate the context-aware universal avatar editing system 106 utilizing a contextual recommendation engine. In particular, FIGS. 5A-5B illustrate the context-aware universal avatar editing system 106 utilizing a contextual recommendation engine to identify context-aware avatar edit recommendations and, subsequently, providing the context-aware avatar edit recommendations for display within context-aware avatar overlay editor.

As shown in FIG. 5A, the context-aware universal avatar editing system 106 identifies extended-reality environment data 502 and user data 503 (e.g., for a user utilizing an extended-reality device to view an extended-reality environment). Then, as shown in FIG. 5A, the context-aware universal avatar editing system 106 utilizes the extended-reality environment data 502 and the user data 503 with a contextual recommendation engine 506 to determine context-aware avatar edit recommendations 510. Indeed, as illustrated in FIG. 5A, the context-aware universal avatar editing system 106 utilizes a contextual recommendation engine 506 (based on historical selection data and/or a machine learning model) that utilizes an avatar graphical asset repository 504 and a social graph 508 with the extended-reality environment data 502 and the user data 503 to determine context-aware avatar edit recommendations 510 that are relevant to the extended-reality environment and a user interacting with the extended-reality environment.

In some embodiments, the context-aware universal avatar editing system 106 identifies and utilizes extended-reality environment data (e.g., extended-reality environment data 502) with a contextual recommendation engine (e.g., the contextual recommendation engine 506). In one or more instances, the context-aware universal avatar editing system 106 identifies the extended-reality environment data from an environment-reality environment and/or an application executing the environment-reality environment. As shown in FIG. 5A, the extended-reality environment data 502 can include, but is not limited to, various combinations of environment type, environment setting, historical avatar appearance data, and/or environment preferences.

For example, the extended-reality environment data can include data, such as, but not limited to, environment type or activity types that represent a category or purpose for the extended-reality environment. For instance, environment type data can indicate whether an extended-reality environment is of a particular purpose (e.g., private, public, social, business, casual, gaming, educational, work-related, dating, sport entertainment, music entertainment, movie entertainment).

In some cases (as environment setting data), the extended-reality environment data includes, but is not limited to, descriptors (e.g., metadata or descriptors describing the extended-reality environment), time-of-day (e.g., nighttime, daytime), date, weather (e.g., weather in the extended-reality environment), seasonal data (e.g., winter, summer, spring, fall), and/or scene information (e.g., indoor, outdoor, mountain range, city, farm, library, restaurant, tennis court, gym). In one or more implementations, the extended-reality environment data (as historical avatar appearance data) includes historical avatar appearance data, such as, but not limited to historical avatar graphical asset selections within the extended-reality environment and/or historical avatar graphical asset purchases within the extended-reality environment.

In one or more embodiments, the extended-reality environment data includes preferences (e.g., environment preferences) for the extended-reality environment (e.g., configured by a developer computing device or administrator device corresponding to the extended-reality environment). For example, in some cases, the extended-reality environment data includes preferences that limit the types of graphical assets (or particular graphical assets) available within a context-aware avatar overlay editor (e.g., an avatar dress code). For example, in some cases, the extended-reality environment data includes preferences, such as preferences to limit graphical assets to avatar content creations from a developer of the extended-reality environment, preferences to limit graphical assets to a specific extended-reality environment type (e.g., business casual, work-related uniforms), and/or preferences to limit graphical assets to a specific theme (e.g., a Halloween theme, a Thanksgiving theme, a birthday party theme).

Furthermore, in one or more embodiments, the context-aware universal avatar editing system 106 identifies and utilizes user data (e.g., user data 503) with a contextual recommendation engine (e.g., the contextual recommendation engine 506). In certain instances, the context-aware universal avatar editing system 106 identifies the user data from a user account profile of the user on a networking system 104 and/or a user account profile from an application operating the environment-reality environment. For example, as shown in FIG. 5A, the user data 503 can include, but is not limited to, various combinations of demographic data, geographic data, social relationships, and/or user activity data.

As an example, user data can include data, such as, but not limited to, demographic data (e.g., gender, age, employment, race, income), geographic data (e.g., current location, residence, employment location), social relationships (e.g., contacts, social network friend, social network family members, blocked users, relationship status), and/or user activity (e.g., historical user activity, user selected avatar graphical assets, user purchased avatar graphical assets). In some implementations, user data can also include data, such as, but not limited to, user affiliations (e.g., social network groups, played games, purchases), user preferences (e.g., privacy preferences, communication preferences, avatar representation preferences), and/or user statuses (e.g., a selected mood within a social networking profile, a status within a social networking profile).

As further shown in FIG. 5A, the context-aware universal avatar editing system 106 utilizes the extended-reality environment data 502 and the user data 503 with the contextual recommendation engine 506. For example, provides the extended-reality environment data 502 and the user data 503 to the contextual recommendation engine 506 and the contextual recommendation engine 506 utilizes the input data with the avatar graphical asset repository 504 to identify the context-aware avatar edit recommendations 510. As shown in FIG. 5A, the context-aware avatar edit recommendations 510 include context-based graphical assets that are selected based on the extended-reality environment data 502 and the user data 503.

As further shown in FIG. 5A, in some cases, the context-aware universal avatar editing system 106 utilizes the contextual recommendation engine 506 with historical selection data. In particular, the context-aware universal avatar editing system 106 can utilize historical trends from avatar (modification) selections in relation to an extended-reality environment. For example, the context-aware universal avatar editing system 106 can rank graphical assets from the avatar graphical asset repository 504 based on historical user selections of avatar graphical assets within a particular extended-reality environment.

In some instances, the context-aware universal avatar editing system 106 further utilizes the social graph 508 to identify or rank historical selection trends of avatar graphical assets within the particular extended-reality environment. For example, the context-aware universal avatar editing system 106 can apply weights to ranked graphical assets utilizing historical trends from one or more users that are similar to the user corresponding to the user data 503 from the social graph 508. As an example, the context-aware universal avatar editing system 106 can identify one or more users that correspond to a high affinity (e.g., have an affinity coefficient that satisfies a preconfigured affinity threshold) to the user data. Then, the context-aware universal avatar editing system 106 can utilize the user trend data of graphical assets selection from high affinity users (from the social graph 508) to modify the ranked graphical assets. For example, the context-aware universal avatar editing system 106 can utilize a social graph as described below (e.g., in relation to FIGS. 11 and 12).

In some instances, the context-aware universal avatar editing system 106 utilizes a user's historical selection data to determine context-aware avatar edit recommendations. For example, the context-aware universal avatar editing system 106 can identify previously selected graphical assets by a user and utilizes the previously selected graphical assets to select recommended graphical assets from an avatar graphical asset repository. In some cases, the context-aware universal avatar editing system 106 can utilize contextual tags of previously selected graphical assets to select recommended graphical assets that correspond to the same (or similar) contextual tags.

Furthermore, in some cases, the context-aware universal avatar editing system 106 can, as part of historical selection data, identify affinities between user data and one or more avatar graphical assets. In particular, the context-aware universal avatar editing system 106 can utilize a social graph to determine affinities between a user and one or more persons or objects from the social graph. Then, the context-aware universal avatar editing system 106 can utilize the related one or more persons or objects to identify avatar graphical assets that have an affinity with the one or more persons or objects in the social graph.

In certain implementations, the context-aware universal avatar editing system 106 can rank avatar graphical assets from an avatar graphical asset repository based on popularity. For example, the context-aware universal avatar editing system 106 can utilize historical social network interactions with avatar graphical assets to rank the avatar graphical assets by popularity. For instance, the context-aware universal avatar editing system 106 can utilize historical social network interactions, such as likes corresponding to the avatar graphical assets and/or comments corresponding to the avatar graphical assets.

In some cases, the context-aware universal avatar editing system 106 can identify relevant contextual tags corresponding to historically selected avatar graphical assets, popular avatar graphical assets, high affinity avatar graphical assets in relation to the extended-reality environment (and/or the user). Then, the context-aware universal avatar editing system 106 can utilize the relevant contextual tags to identify additional avatar graphical assets from an avatar graphical asset repository that include the relevant contextual tags. Indeed, the context-aware universal avatar editing system 106 can provide the additional avatar graphical assets with matching relevant contextual tags as context-aware avatar edit recommendations.

As also shown in FIG. 5A, the context-aware universal avatar editing system 106 can utilize the contextual recommendation engine 506 with a machine learning model. In one or more embodiments, the context-aware universal avatar editing system 106 can utilize a machine learning model to receive various combinations of input extended-reality environment data, user data, and/or social graph data to determine (or select) relevant graphical assets (that match the extended-reality environment data and user data). In some cases, the context-aware universal avatar editing system 106 can utilize a machine learning model to determine probabilities of graphical assets being selected by a user when presented within a context-aware avatar overlay editor. Then, the context-aware universal avatar editing system 106 can select the graphical assets using the probabilities (e.g., upon the probabilities satisfying a preconfigured threshold probability).

In one or more embodiments, the context-aware universal avatar editing system 106 utilizes the machine learning model to receive various combinations of input extended-reality environment data, user data, and/or social graph in order to output contextual tag classifications. In particular, the context-aware universal avatar editing system 106 can utilize a machine learning model that outputs probabilities for contextual tags that indicate a likelihood of the contextual tag being relevant to a user (and/or within an extended-reality environment). Then, in one or more embodiments, the context-aware universal avatar editing system 106 selects one or more contextual tags based on the probabilities corresponding to the contextual tags (e.g., utilizing a preconfigured threshold probability). Subsequently, the context-aware universal avatar editing system 106 can utilize the determined one or more contextual tags to select graphical assets that match the contextual tags (e.g., are assigned the contextual tags) as the context-based graphical assets (e.g., content-aware avatar edit recommendations).

In some embodiments, the context-aware universal avatar editing system 106 trains a machine learning model to select or determine graphical assets (or contextual tags). For example, the context-aware universal avatar editing system 106 identifies (or generates) a training data set having user data, extended-reality environment data, and/or social graph data and a corresponding selection for avatar modifications (e.g., graphical assets) as ground truth data. Indeed, the context-aware universal avatar editing system 106 can identify the training data set from historical data and/or user generated training data.

Then, the context-aware universal avatar editing system 106 can provide the input data from the training data set to the machine learning model to generate predicted or determined graphical assets (or contextual tags). In one or more embodiments, the context-aware universal avatar editing system 106 compares the predictions to the ground truth data (e.g., the ground truth graphical asset selections). Additionally, the context-aware universal avatar editing system 106 can determine a loss value that indicates an accuracy or error rate of the machine learning model predictions.

In some cases, the context-aware universal avatar editing system 106 can utilize the determined loss value to learn parameters of the machine learning model (e.g., via back-propagation). For example, the context-aware universal avatar editing system 106 can iteratively utilize a machine learning model with a training data set to determine predicted graphical assets (or contextual tags) and compare the predictions to ground truth selections to determine a loss value. Moreover, the context-aware universal avatar editing system 106 can utilize the iterative loss value to iteratively learn parameters (e.g., as a feedback loop) of the machine learning model until a desired level of accuracy is achieved (e.g., satisfying an error threshold by being less than or equal to the error threshold). In one or more embodiments, the context-aware universal avatar editing system 106 utilizes various loss functions (or loss values). For example, the context-aware universal avatar editing system 106 can utilize loss functions (or loss values), such as, but not limited to mean square error, quadratic loss, L2 loss, squared error loss, and/or absolute error loss.

In one or more embodiments, the context-aware universal avatar editing system 106 utilizes a combination of a machine learning model and historical selection data to determine context-aware avatar edit recommendations. For example, in some cases, the context-aware universal avatar editing system 106 utilizes a machine learning model (with extended-reality environment data and user data) to determine predicted graphical assets (or contextual tags). Then, the context-aware universal avatar editing system 106 can further rank and/or weight the predicted graphical assets using historical selection data (e.g., historical trends, activity, or selections) in accordance with one or more implementations herein.

As further shown in the transition from FIG. 5A to FIG. 5B, the context-aware universal avatar editing system 106 utilizes the context-aware avatar edit recommendations 510 (e.g., context-based graphical assets) within a context-aware overlay avatar editor 516. Indeed, as shown in FIG. 5B, the context-aware universal avatar editing system 106 provides, for display within a client device 512 and within an extended-reality environment 514, the context-aware overlay avatar editor 516 with context-based graphical assets 518 determined utilizing the contextual recommendation engine 506.

As shown in FIG. 5B, the client device 512 displays the extended-reality environment 514 to represent a poker tournament venue. Accordingly, the context-aware universal avatar editing system 106 utilizes the contextual recommendation engine 506 to identify context-aware avatar edit recommendations 510 that are relevant to the extended-reality environment 514 representing the poker tournament venue. For instance, the context-aware universal avatar editing system 106 can provide, for display within the context-aware overlay avatar editor 516, context-based graphical assets 518 that are relevant to the extended-reality environment 514 representing a poker tournament venue (e.g., sunglasses).

In one or more embodiments, the context-aware universal avatar editing system 106 provides various context-based graphical assets utilizing a contextual recommendation engine. For example, in some cases, the context-aware universal avatar editing system 106 provides, for display within the context-aware overlay avatar editor, a set of most popular avatar graphical assets for avatar modifications. In some implementations, the context-aware universal avatar editing system 106 provides, for display within the context-aware overlay avatar editor, a set of sport-related graphical assets when the extended-reality environment represents a sport video game or a sporting event.

Additionally, in some cases, the context-aware universal avatar editing system 106 provides, for display within the context-aware overlay avatar editor, a set of athletic wear-related graphical assets for an extended-reality environment representing a video game with a physical activity component (e.g., dancing or sports video game). In one or more implementations, the context-aware universal avatar editing system 106 provides, for display within the context-aware overlay avatar editor, a set of movie themed graphical assets for an extended-reality environment representing a particular movie or movie showing event. Additionally, in some instances, the context-aware universal avatar editing system 106 provides, for display within the context-aware overlay avatar editor, a set of office-related graphical assets for an extended-reality environment representing an office and/or workspace.

In one or more embodiments, the context-aware universal avatar editing system 106 determines and displays context-based graphical assets within the context-aware overlay avatar editor based on a location within an extended-reality environment. For instance, an application can execute an extended-reality environment that includes distinct settings, regions, and areas to explore. For example, the extended-reality environment can include an open world having environments for extended-reality environments representing concert venues, marketplaces, office spaces, playgrounds, and so forth.

Figure 6A:
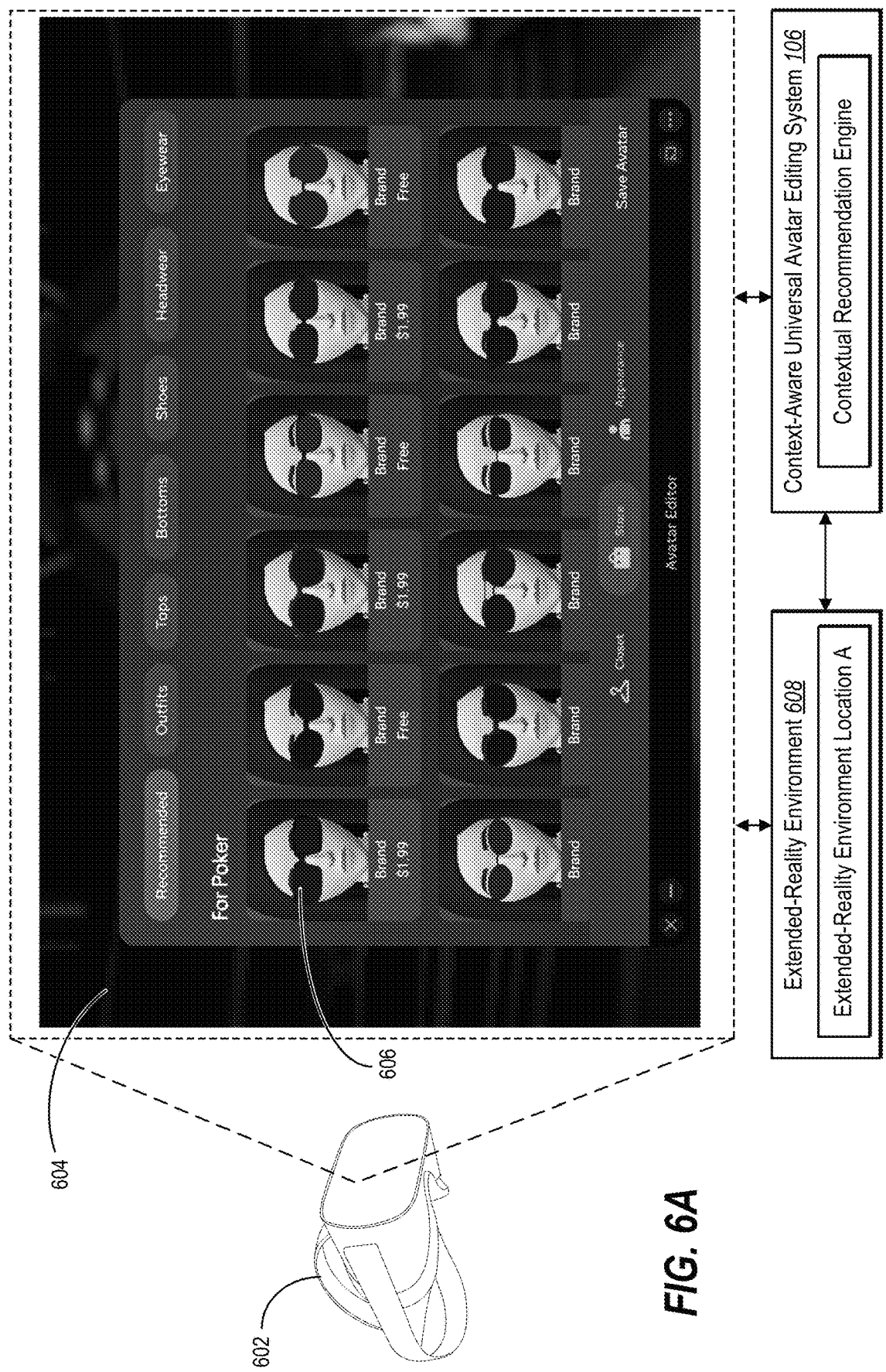
FIGS. 6A and 6B illustrate a context-aware universal avatar editing system utilizing varying recommended avatar edits within a context-aware avatar overlay editor for different locations of an extended-reality environment in accordance with one or more implementations.

The context-aware universal avatar editing system 106 can utilize locations within the extended-reality environment with a contextual recommendation engine to provide context-based graphical asset recommendations that are relevant for the location within the extended-reality environment. As an example, FIG. 6A illustrates the context-aware universal avatar editing system 106 providing, for display via an extended-reality device 602, a context-aware avatar overlay editor 606 within an extended-reality environment 604 (as an extended-reality environment location A) representing a poker tournament venue. Indeed, as shown in FIG. 6A, the context-aware universal avatar editing system 106 utilizes data from the extended-reality environment 608 (which includes the extended-reality environment location A) and/or user data to display, within context-aware avatar overlay editor 606, context-based graphical assets specific to the extended-reality environment location A (e.g., sunglasses for an extended-reality environment representing a poker tournament venue).

Figure 6B:
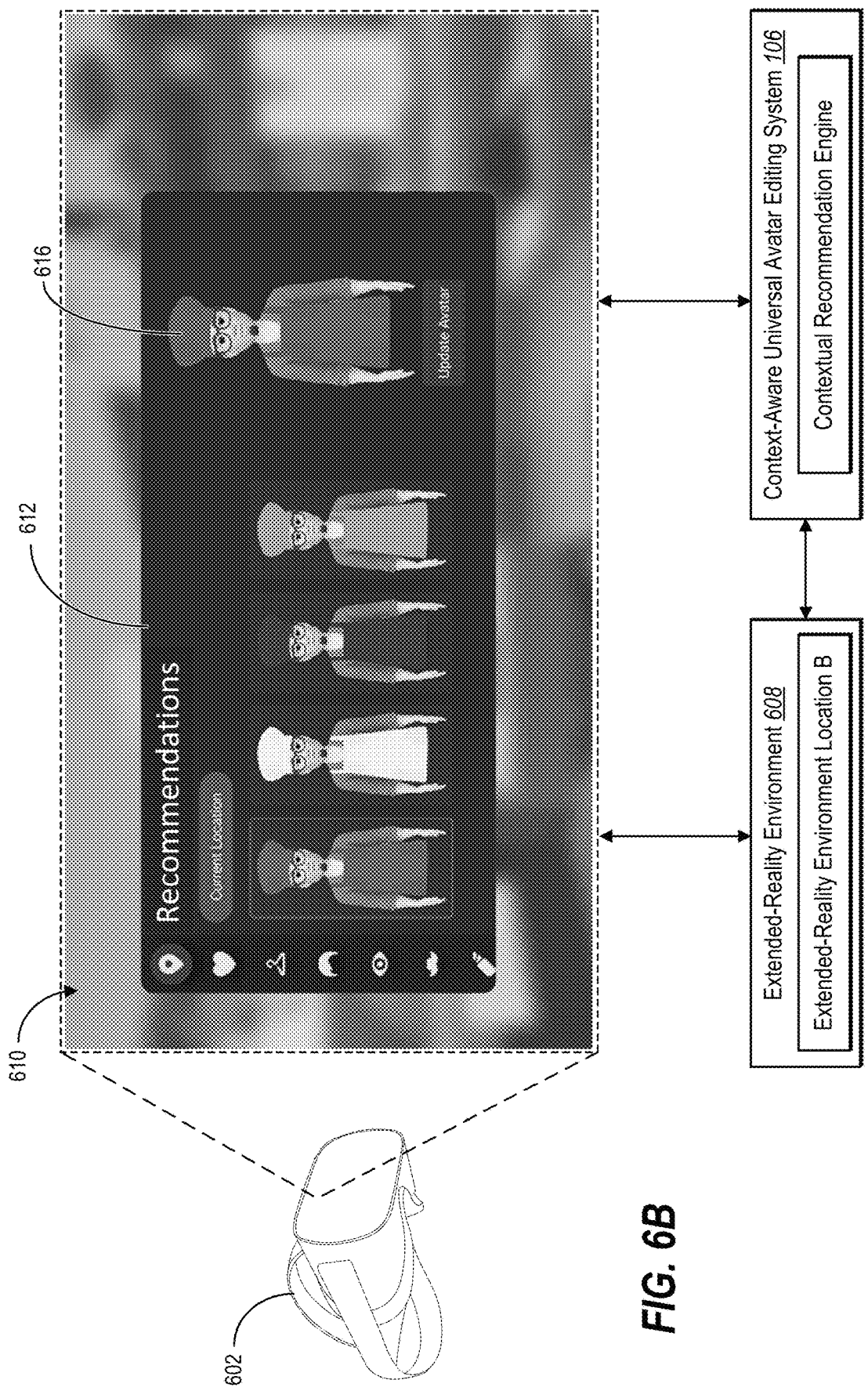

Furthermore, as shown in the transition from FIG. 6A to FIG. 6B, the application executing the extended-reality environment 608 can move a user to another extended-reality environment location (e.g., extended-reality environment B) that represents a food market (e.g., via user interactions and/or user movements). Indeed, FIG. 6B illustrates the context-aware universal avatar editing system 106 providing, for display via an extended-reality device 602, a context-aware avatar overlay editor 612 within an extended-reality environment 610 (e.g., an extended-reality environment location B) representing a food market. Furthermore, the context-aware universal avatar editing system 106 can utilize data from the extended-reality environment 608 (which includes the extended-reality environment location B) and/or user data to display, within context-aware avatar overlay editor 612, context-based graphical assets specific to the extended-reality environment location B (e.g., cooking attire for an extended-reality environment representing a food market).

As mentioned above, in some cases, the context-aware universal avatar editing system 106 can provide, for display within a context-aware avatar overlay editor, a preview of an avatar with selected graphical assets. For example, FIG. 6B illustrates the context-aware universal avatar editing system 106 providing, for display within the context-aware avatar overlay editor 612, a preview 616 of an avatar with selected graphical assets from the context-aware avatar overlay editor 612. Indeed, in one or more embodiments, the context-aware universal avatar editing system 106 previews multiple selected graphical assets in the preview 616.

Indeed, in some instances, the context-aware universal avatar editing system 106 can continuously change context-based recommendations for avatar modifications based on movement of a user within an extended-reality environment with multiple regions or areas (i.e., extended-reality environment locations). Furthermore, the regions and/or areas of the extended-reality environment can be within a single application or multiple applications. In addition, the context-aware universal avatar editing system 106 can provide, for display within a context-aware avatar overlay editor, updated context-based graphical assets specific for the current location in the extended-reality environment without leaving the extended-reality environment.

Figure 7A:
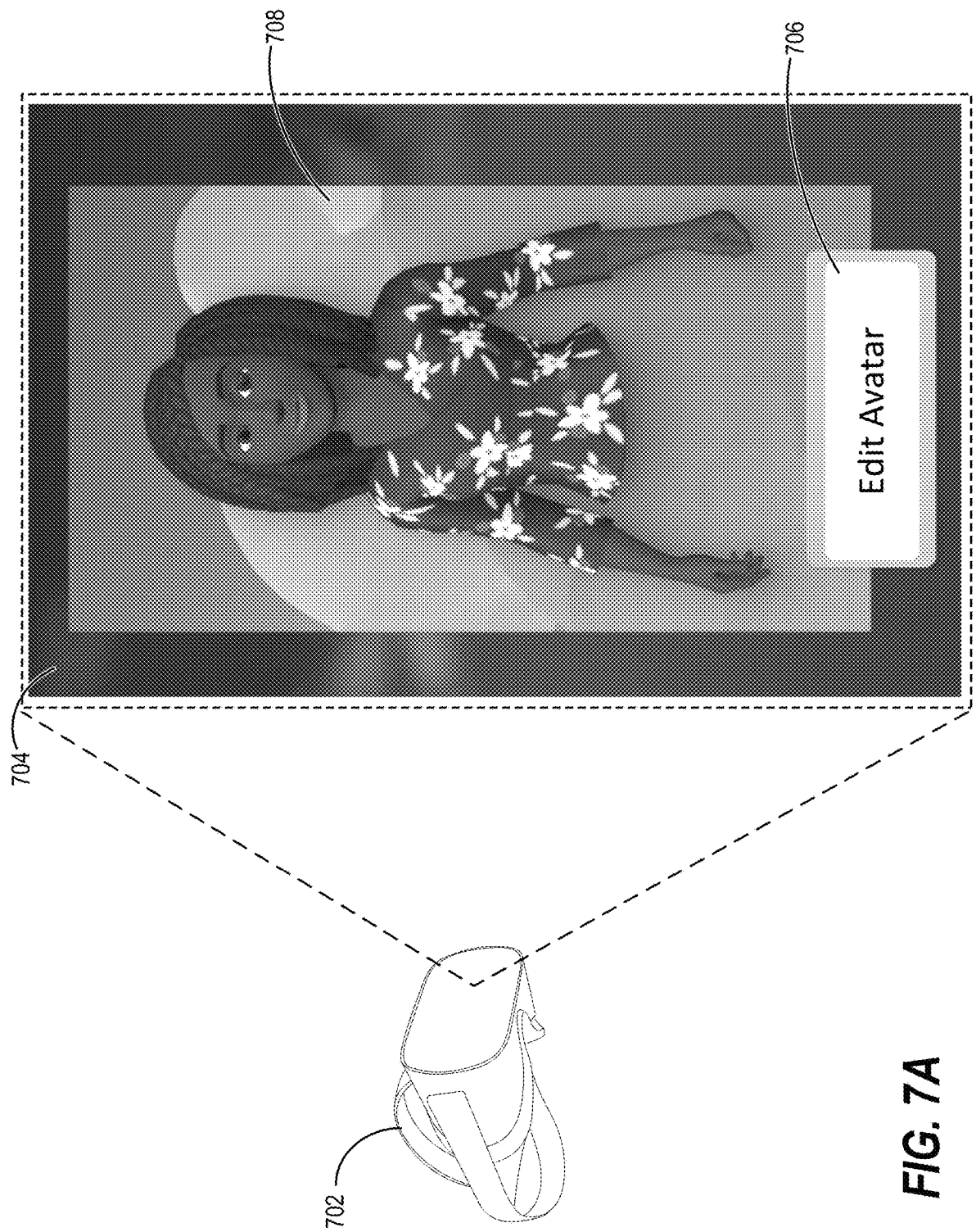
FIGS. 7A-7E illustrate a context-aware universal avatar editing system displaying a context-aware avatar overlay editor to modify an avatar in accordance with one or more implementations.

As an additional example, FIGS. 7A-7E illustrate the context-aware universal avatar editing system 106 generating, for display to a user via an extended-reality device, a context-aware avatar overlay editor within an active extended-reality environment to modify an avatar (e.g., with avatar appearance modifications and saved modifications). As shown in FIG. 7A, the context-aware universal avatar editing system 106 displays, via the client device 702 (e.g., an extended-reality device) an overlay menu 708 within an extended-reality environment 704. In addition, as shown in FIG. 7A, the context-aware universal avatar editing system 106 displays, via the client device 702, a selectable option 706 to edit an avatar corresponding to the user within the extended-reality environment 704.

Figure 7B:
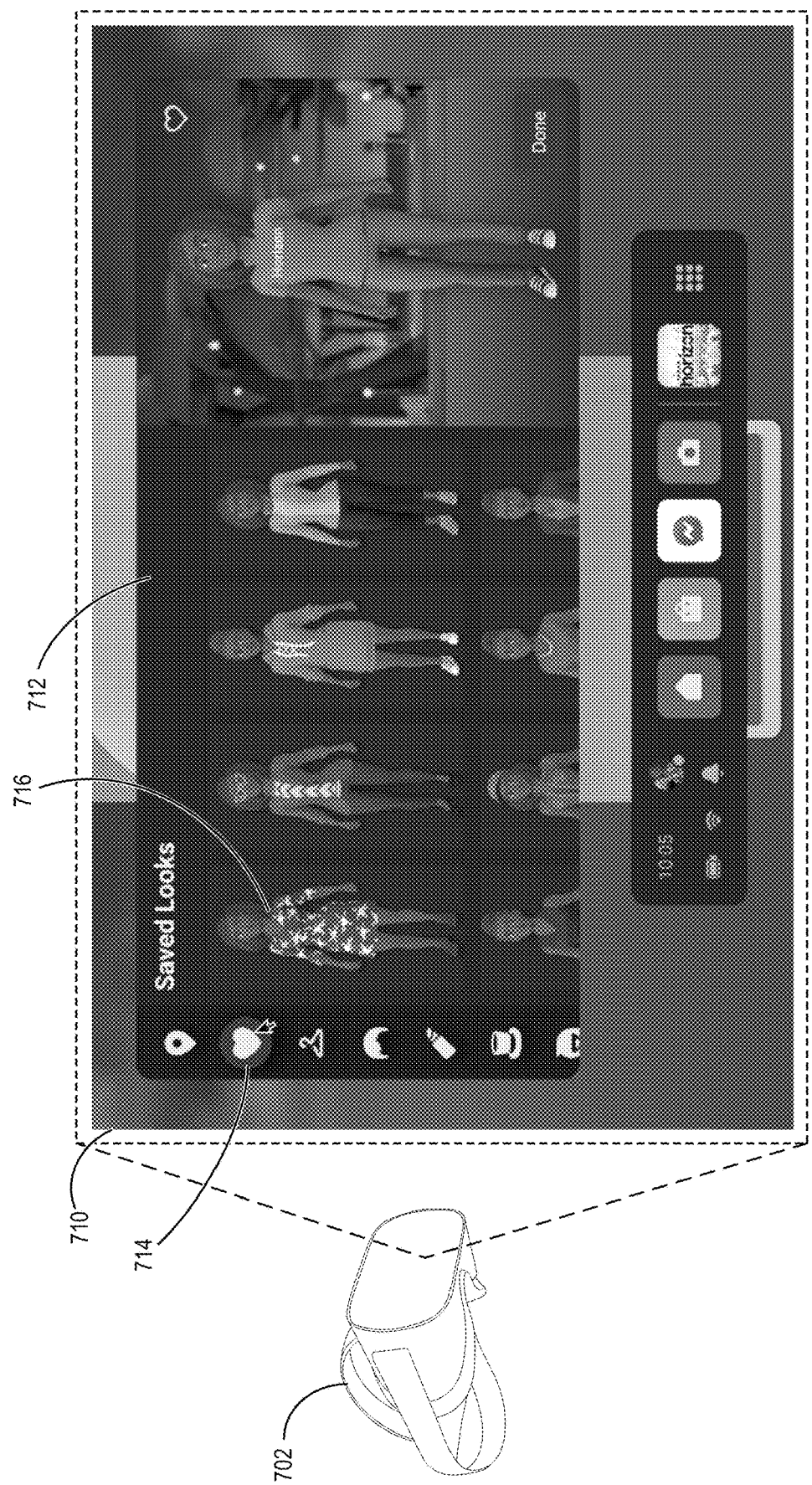

Moreover, as shown in the transition from FIG. 7A to FIG. 7B, the context-aware universal avatar editing system 106 displays, via the client device 702, a context-aware avatar overlay editor 712 within an extended-reality environment 710. Additionally, as part of the context-aware avatar overlay editor 712, the context-aware universal avatar editing system 106 provides, for display, a saved modification tab 714 (e.g., a saved outfit tab). As shown in FIG. 7B, the context-aware universal avatar editing system 106 provides, for display, within the context-aware avatar overlay editor 712 under the saved modification tab 714, a selectable graphical asset 716 that includes multiple graphical assets previously saved to represent an outfit for the avatar.

Figure 7C:
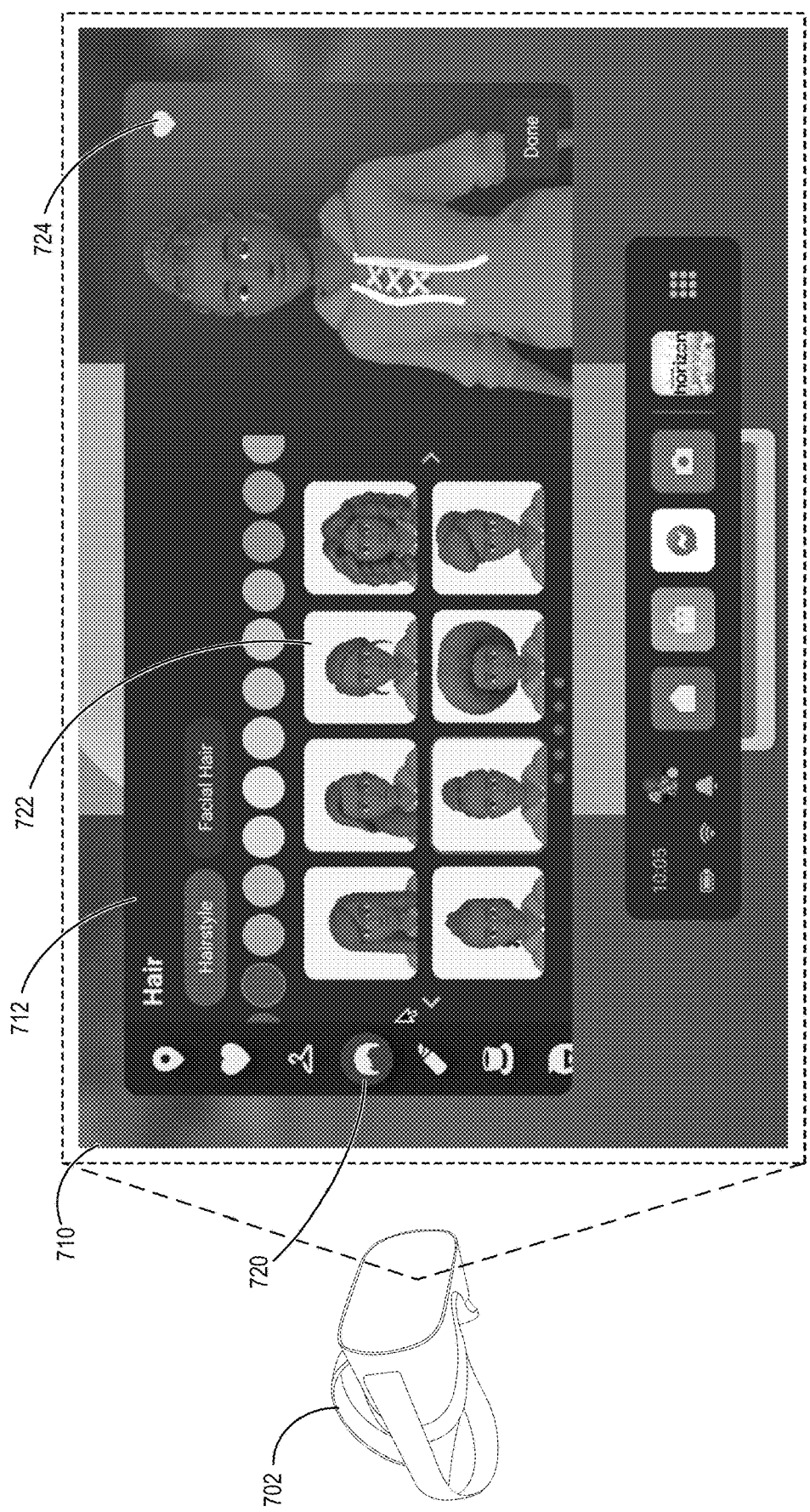

Additionally, as shown in FIG. 7C, the context-aware universal avatar editing system 106 displays, via the client device 702, the context-aware avatar overlay editor 712 within an extended-reality environment 710 to modify an appearance of an avatar. As shown in FIG. 7C, the context-aware universal avatar editing system 106 provides, for display, a hairstyle modification tab 720. As further shown in FIG. 7C, the context-aware universal avatar editing system 106 provides, for display, within the context-aware universal avatar editing system 106 under the hairstyle modification tab 720, a selectable graphical asset 722 that includes a hairstyle appearance change (e.g., a graphical asset representing a hairstyle) to modify a hairstyle of the avatar. In some cases, as shown in FIG. 7C, the context-aware universal avatar editing system 106 provides, for display, options to modify colors of graphical assets (e.g., hair color, shirt color, lipstick color, hat color).

Furthermore, as shown in FIG. 7C, the context-aware universal avatar editing system 106 displays, via the client device 702 and within the context-aware avatar overlay editor 712, a selectable option 724 to save an avatar modification (e.g., a selected avatar outfit). Upon receiving a selection of the selectable option 724, the context-aware universal avatar editing system 106 stores the selected avatar modification for selection within the context-aware avatar overlay editor 712. For example, the context-aware universal avatar editing system 106 can store and display the selected avatar modification under a saved modification tab (e.g., the saved modification tab 714).

Figure 7D:
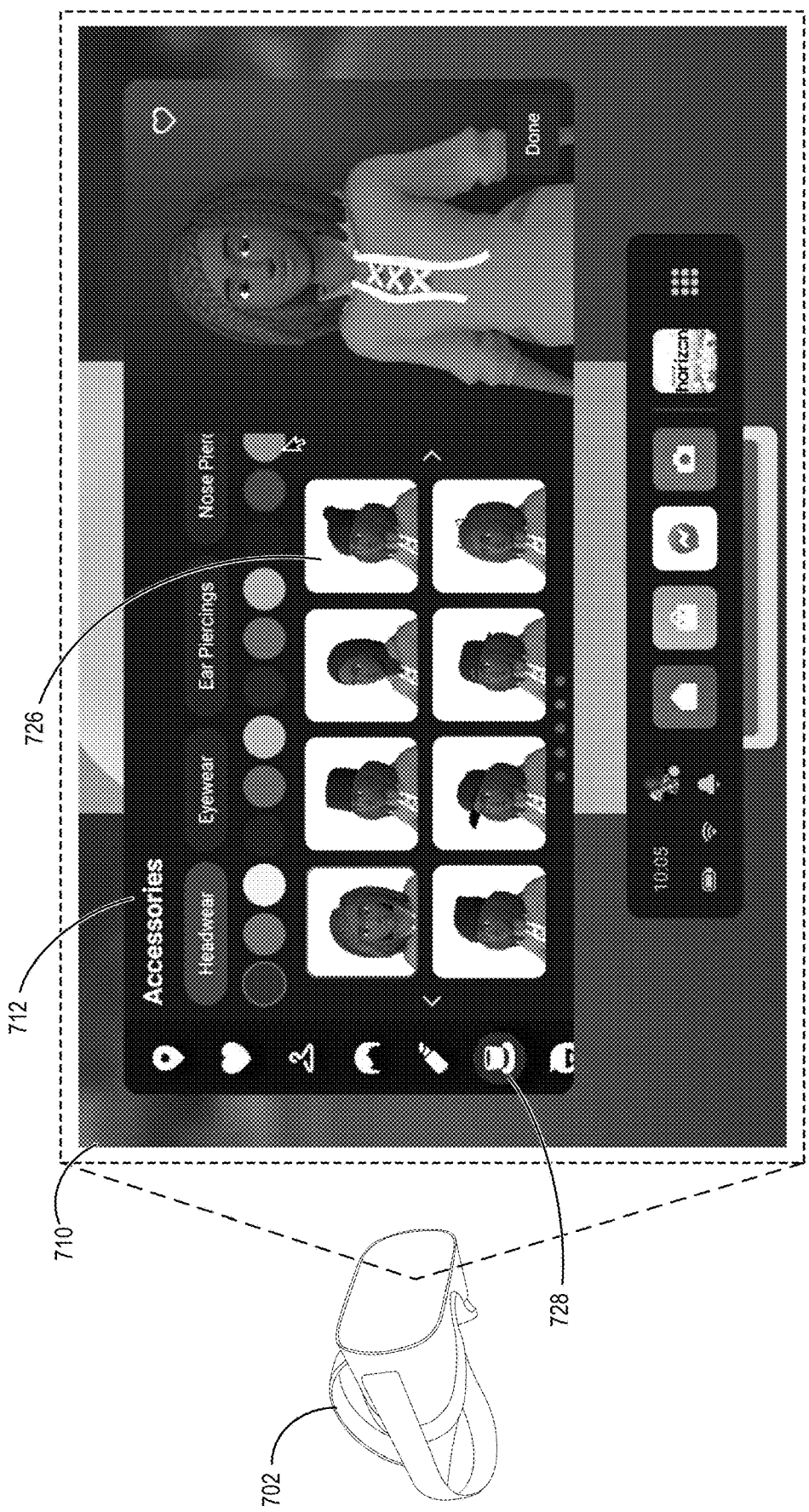

Furthermore, as shown in FIG. 7D, the context-aware universal avatar editing system 106 displays, via the client device 702 and within the context-aware avatar overlay editor 712, an avatar accessory modification tab 728 (e.g., head wear). As shown in FIG. 7D, the context-aware universal avatar editing system 106 provides, for display, within the context-aware universal avatar editing system 106 under the avatar accessory modification tab 728, a selectable graphical asset 726 that includes a head wear appearance change (e.g., a graphical asset representing a hat accessory) to modify accessories of the avatar. Indeed, the context-aware universal avatar editing system 106 can provide avatar accessory modification tabs for various avatar accessories (e.g., hats, glasses, shoes, ties, watches). In some cases, the context-aware universal avatar editing system 106 can also provide a selectable option to navigate to a dedicated avatar editing application.

Figure 7E:
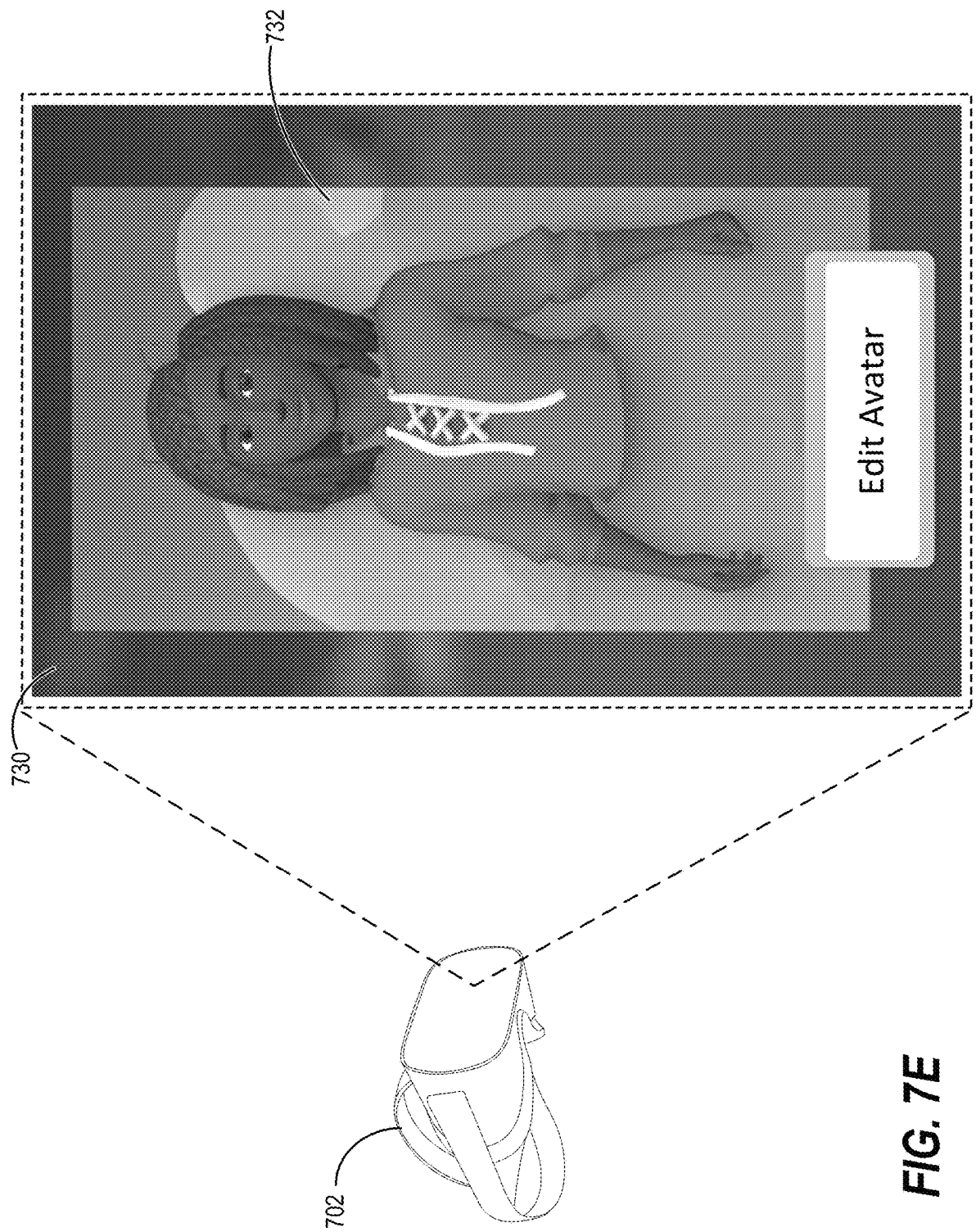

As further shown in the transition from FIG. 7D to FIG. 7E, the context-aware universal avatar editing system 106 can upon receiving user selections within the context-aware avatar overlay editor 712 modify the particular avatar. For instance, as shown in FIG. 7E, the context-aware universal avatar editing system 106 displays, via the client device 702 (e.g., an extended-reality device), an overlay menu 732 within the extended-reality environment 730. As part of the overlay menu, as shown in FIG. 7E, the context-aware universal avatar editing system 106 displays a preview of a modified avatar (e.g., from user selections within the context-aware avatar overlay editor 712).

Figure 8:
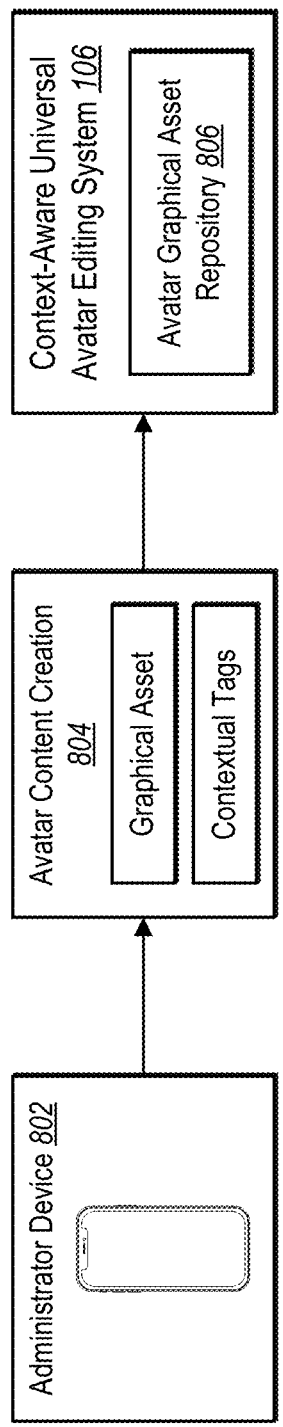
FIG. 8 illustrates a context-aware universal avatar editing system receiving avatar content creations in accordance with one or more implementations.

Additionally, in some cases, the context-aware universal avatar editing system 106 can receive avatar content creations for an avatar graphical asset repository. For instance, the context-aware universal avatar editing system 106 can receive avatar modifiers (e.g., graphical assets) created by users to include within the avatar graphical asset repository. For example, as shown in FIG. 8, the context-aware universal avatar editing system 106 receives an avatar content creation 804 from an administrator device 802. As further shown in FIG. 8, the avatar content creation 804 can include a graphical asset and contextual tags for the graphical asset. Furthermore, as shown in FIG. 8, the context-aware universal avatar editing system 106 stores the avatar content creation 804 within an avatar graphical asset repository 806 such that the graphical asset from the avatar content creation 804 can be selected and/or displayed within a context-aware avatar overlay editor as described in one or more implementations herein.

In one or more embodiments, the administrator device 802 (from FIG. 8) includes a developer computing device corresponding to an application of an extended-reality environment. Indeed, the context-aware universal avatar editing system 106 can receive avatar graphical assets (e.g., with contextual tags) that are relevant and/or specific to an extended-reality environment from a developer computing device corresponding to the application of the extended-reality environment. In some cases, the administrator device 802 (from FIG. 8) includes a user device that creates a personalized (or custom) avatar graphical asset (e.g., with contextual tags).

Furthermore, in one or more embodiments, the context-aware universal avatar editing system 106 can receive avatar content creations (e.g., graphical assets) as purchasable items. For example, the context-aware universal avatar editing system 106 can receive, from a developer computing device corresponding to an application of an extended-reality environment, graphical assets as a purchasable content item within the extended-reality environment. Indeed, in one or more embodiments, the context-aware universal avatar editing system 106 can facilitate the purchase of these graphical assets for an avatar within the context-aware avatar overlay editor as described above (e.g., in relation to FIG. 4).

In some cases, the context-aware universal avatar editing system 106 can provide, for display via a head-mounted display and/or client device, a context-aware avatar overlay editor within an augmented reality scene. For example, the networking system 104 can provide, for display within a head-mounted display and/or client device a view of persons (as avatars) within a real-world scene viewed through the head-mounted display and/or a camera feed of the client device. In one or more embodiments, the context-aware universal avatar editing system 106 can provide, within a context-aware avatar overlay editor, options to select an appearance of a user avatar and how co-users view the user avatar within an augmented reality scene. In addition, the context-aware universal avatar editing system 106 can provide context-based recommendations for the augmented reality avatar based various combinations of data described above and/or a location of the augmented reality call or augmented reality event. For example, a location of the augmented reality call or augmented reality event can include real-world locations, such as, but not limited to, a corporate building, a park, a home space, an office space, a school, a concert, and/or a sporting event.

In one or more embodiments, the context-aware universal avatar editing system 106 is implemented on a computing device with various components and capabilities. One or more components of the context-aware universal avatar editing system 106 can include software, hardware, or both. For instance, one or more components of the context-aware universal avatar editing system 106 can include one or more instructions stored on a computer-readable storage medium and can be executable by processors of one or more computing devices, such as a client device or server device. When executed by the one or more processors, the computer-executable instructions of the context-aware universal avatar editing system 106 can cause the computing device(s) to perform the methods described herein. Alternatively, the one or more components of the context-aware universal avatar editing system 106 can include hardware, such as a special-purpose processing device to perform a certain function or group of functions. Alternatively, the one or more components of the context-aware universal avatar editing system 106 can include a combination of computer-executable instructions and hardware.

Furthermore, the one or more components of the context-aware universal avatar editing system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the one or more components of the context-aware universal avatar editing system 106 may be implemented as a stand-alone application, such as a desktop or mobile application. Furthermore, the one or more components of the context-aware universal avatar editing system 106 may be implemented as one or more web-based applications hosted on a remote server. Alternatively, or additionally, the one or more components of the context-aware universal avatar editing system 106 may be implemented in a suite of mobile device applications or "apps."

Figure 9:
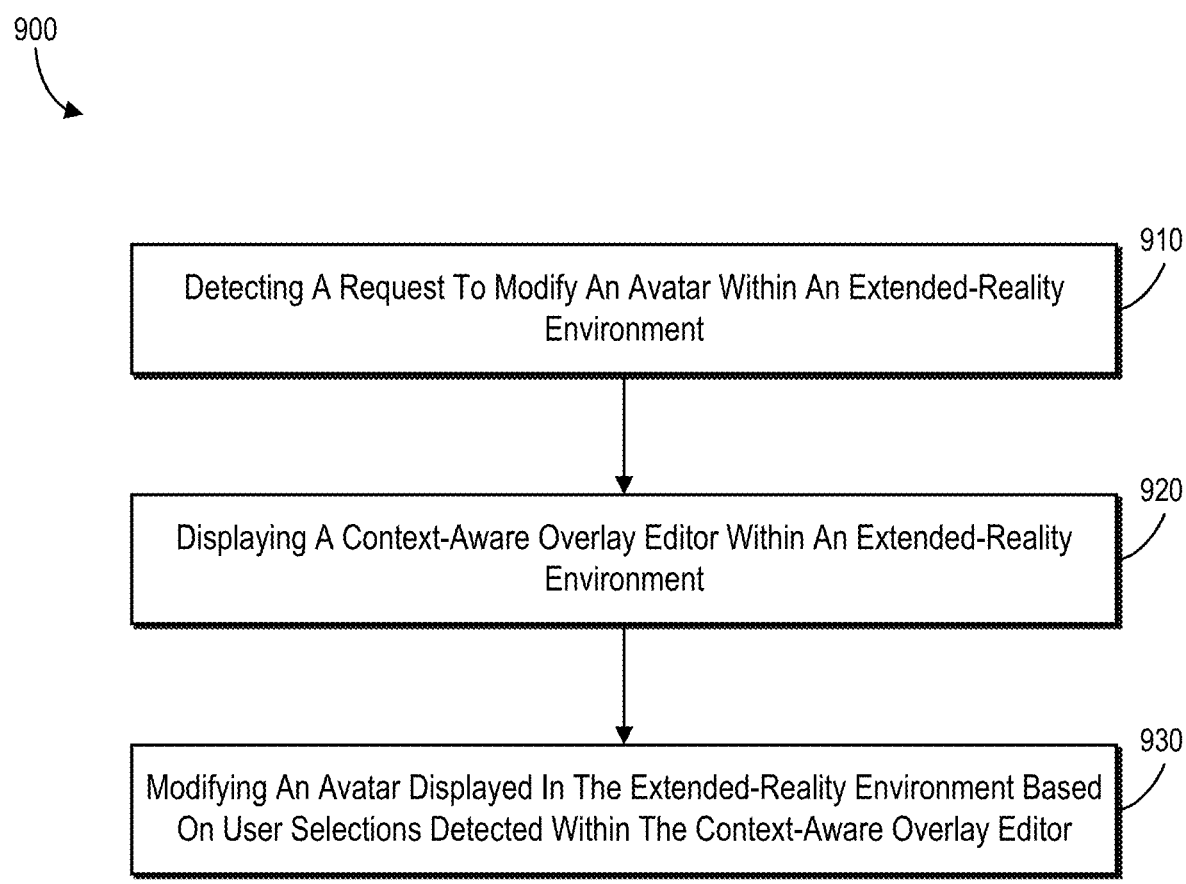
FIG. 9 illustrates a flowchart of a series of acts for providing a context-aware avatar overlay editor within an active extended-reality environment to modify an avatar in accordance with one or more implementations.

FIGS. 1-8, the corresponding text and the examples provide a number of different methods, systems, devices, and non-transitory computer-readable media of the context-aware universal avatar editing system 106. In addition to the foregoing, one or more embodiments can also be described in terms of flowcharts comprising acts for accomplishing particular results, as shown in FIG. 9. FIG. 9 may be performed with more or fewer acts. Furthermore, the acts shown in FIG. 9 may be performed in different orders. Additionally, the acts described in FIG. 9 may be repeated or performed in parallel with one another or in parallel with different instances of the same or similar acts.

For example, FIG. 9 illustrates a flowchart of a series of acts 900 for displaying a context-aware avatar overlay editor within an active extended-reality environment to modify an avatar in accordance with one or more implementations. While FIG. 9 illustrates acts according to one or more embodiments, alternative embodiments may omit, add to, reorder, and/or modify any of the acts shown in FIG. 9. In some implementations, the acts of FIG. 9 are performed as part of a method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one processor. The system can further include a non-transitory computer-readable medium comprising instructions that, when executed by the at least one processor, cause the system to perform the acts of FIG. 9.

As shown in FIG. 9, the series of acts 900 includes an act 910 of detecting a request to modify an avatar within an extended-reality environment. For instance, the act 910 can include detecting, from an extended-reality device corresponding to a user of a networking system, a request to modify an avatar of the user displayed within an extended-reality environment on the extended-reality device.

Furthermore, as shown in FIG. 9, the series of acts 900 includes an act 920 of displaying a context-aware overlay editor within an extended-reality environment. For example, the act 920 can include providing, for display on the extended-reality device, a context-aware overlay editor as an overlay within an extended-reality environment. For instance, a context-aware overlay editor can include a context-based graphical asset. In certain implementations, the act 920 can include providing a context-aware overlay editor as an overlay within an extended-reality environment while co-users remain active within the extended-reality environment. Furthermore, in one or more embodiments, the act 920 includes providing a context-aware overlay editor for display within a visual element displayed within an extended-reality environment.

In one or more implementations, the act 920 can include identifying a context-based graphical asset for a user of a networking system utilizing a contextual recommendation engine. In some cases, the act 920 can include identifying a context-based graphical asset utilizing a contextual recommendation engine with extended-reality environment data corresponding to an extended-reality environment. Furthermore, the act 920 can include identifying a context-based graphical asset utilizing a contextual recommendation engine with user data corresponding to a user of the networking system. Moreover, the act 920 can include identifying a context-based graphical asset for a user of a networking system utilizing a contextual recommendation engine with a social graph. For instance, a context-based graphical asset can include a visual element for an appearance of the avatar or a graphical skin for the avatar. Moreover, a contextual recommendation engine can include a machine learning model or a historical user selection model. In one or more embodiments, the act 920 includes selecting a context-based graphical asset from an avatar graphical asset repository which includes user-generated graphical assets with one or more contextual tags. Additionally, act 920 can involve determining a context of the extended-reality environment and selecting the context-based graphical asset based on the context of the extended-reality environment. For example, act 920 can involve determining a theme of the extended-reality environment and selecting the context-based graphical asset based on the context of the extended-reality environment comprises identifying the context-based graphical asset from an avatar graphical asset repository based on mapping one or more contextual tags associated with the context-based graphical asset to the theme of the extended-reality environment.

In some cases, the act 920 can include identifying a context-based graphical asset for a context-aware overlay editor based on a location represented within an extended-reality environment. Moreover, the act 920 can include, upon detecting user navigation to a subsequent location represented within an extended-reality environment, identifying a subsequent context-based graphical asset for a context-aware overlay editor based on the subsequent location and providing the subsequent context-based graphical asset for display within the context-aware overlay editor. Additionally, the act 920 can include integrating a context-aware overlay editor data package within a third-party application corresponding to an extended-reality environment to cause the extended-reality environment to display a context-aware overlay editor within the extended-reality environment.

Moreover, as shown in FIG. 9, the series of acts 900 includes an act 930 of modifying an avatar displayed in the extended-reality environment based on a user selection(s) detected within the context-aware overlay editor. Additionally, as shown in FIG. 9, the act 930 can include providing a modified avatar within an additional extended-reality environment based on a user selection detected within a context-aware overlay editor from an extended-reality environment.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
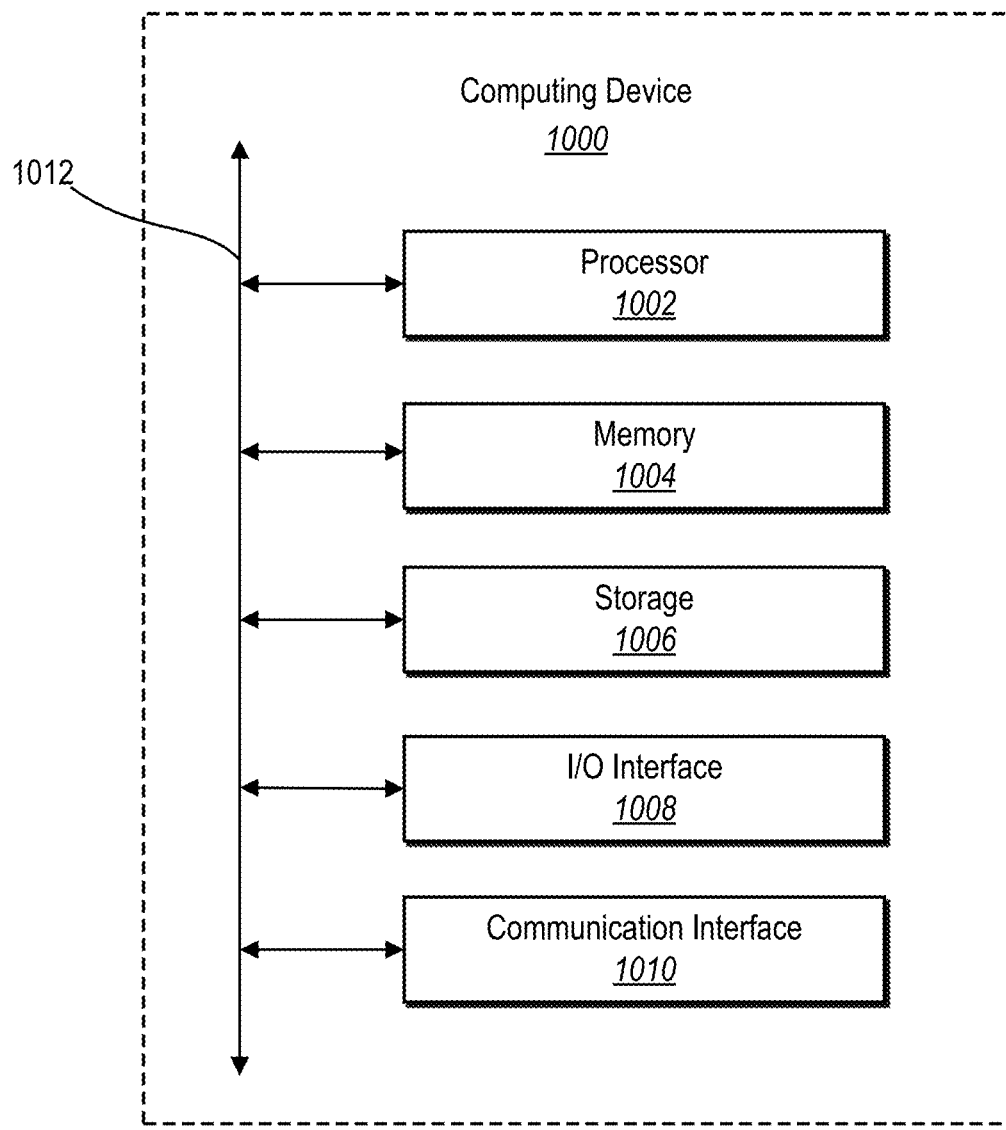
FIG. 10 illustrates a block diagram of an example computing device in accordance with one or more implementations.

FIG. 10 illustrates a block diagram of an example computing device 1000 that may be configured to perform one or more of the processes described above. One will appreciate that one or more computing devices, such as the computing device 1000 may represent the computing devices described above (e.g., server device(s) 102 and/or client devices 110*a*-110*n*). In one or more embodiments, the computing device 1000 may be a mobile device (e.g., a mobile telephone, a smartphone, a PDA, a tablet, a laptop, a camera, a tracker, a watch, a wearable device, a head mounted display, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments.

Furthermore, in certain embodiments, the computing device 1000 includes fewer components than those shown in FIG. 10. Components of the computing device 1000 shown in FIG. 10 will now be described in additional detail.

In one or more embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other. As an example, the bus 1012 may include one or more types of buses.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g., wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

Figure 11:
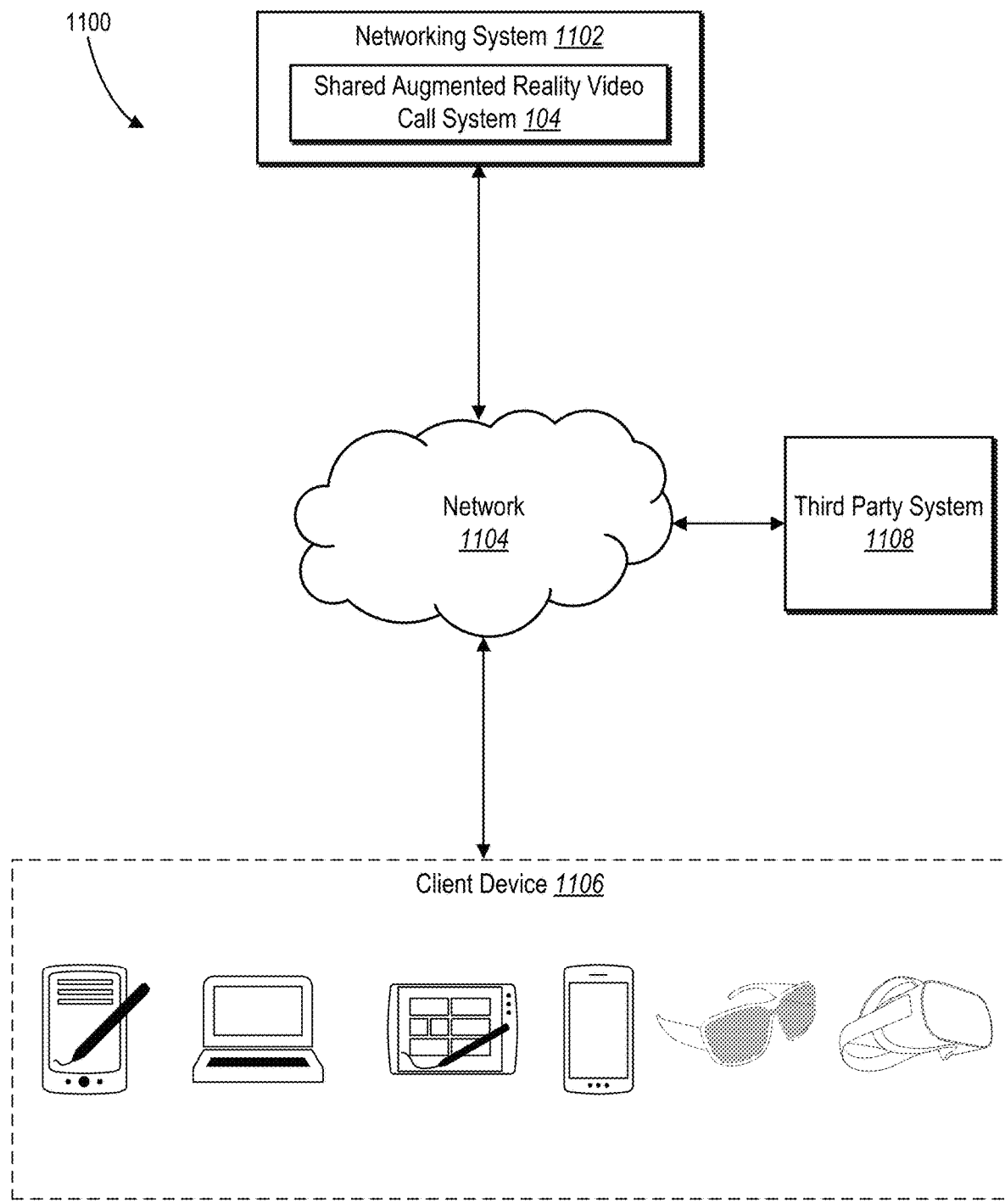
FIG. 11 illustrates an example environment of a networking system in accordance with one or more implementations.

FIG. 11 illustrates an example network environment 1100 of a social networking system. Network environment 1100 includes a client device 1106, a networking system 1102 (e.g., a social networking system and/or an electronic messaging system), and a third-party system 1108 connected to each other by a network 1104. Although FIG. 11 illustrates a particular arrangement of client device 1106, networking system 1102, third-party system 1108, and network 1104, this disclosure contemplates any suitable arrangement of client device 1106, networking system 1102, third-party system 1108, and network 1104. As an example, and not by way of limitation, two or more of client device 1106, networking system 1102, and third-party system 1108 may be connected to each other directly, bypassing network 1104. As another example, two or more of client device 1106, networking system 1102, and third-party system 1108 may be physically or logically co-located with each other in whole or in part. Moreover, although FIG. 11 illustrates a particular number of client devices 1106, networking systems 1102, third-party systems 1108, and networks 1104, this disclosure contemplates any suitable number of client devices 1106, networking systems 1102, third-party systems 1108, and networks 1104. As an example, and not by way of limitation, network environment 1100 may include multiple client device 1106, networking systems 1102, third-party systems 1108, and networks 1104.

This disclosure contemplates any suitable network 1104. As an example and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client device 1106, networking system 1102, and third-party system 1108 to communication network 1104 or to each other. This disclosure contemplates any suitable links. In one or more embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In one or more embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In one or more embodiments, client device 1106 may be an electronic device including hardware, software, or embedded logic components or a combination of two or more such components and capable of carrying out the appropriate functionalities implemented or supported by client device 1106. As an example, and not by way of limitation, a client device 1106 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1106. A client device 1106 may enable a network user at client device 1106 to access network 1104. A client device 1106 may enable its user to communicate with other users at other client devices 1106.

In one or more embodiments, client device 1106 may include a web browser, and may have one or more add-ons, plug-ins, or other extensions. A user at client device 1106 may enter a Uniform Resource Locator (URL) or other address directing the web browser to a particular server (such as server, or a server associated with a third-party system 1108), and the web browser may generate a Hyper Text Transfer Protocol (HTTP) request and communicate the HTTP request to server. The server may accept the HTTP request and communicate to client device 1106 one or more Hyper Text Markup Language (HTML) files responsive to the HTTP request. Client device 1106 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In one or more embodiments, networking system 1102 may be a network-addressable computing system that can host an online social network. Networking system 1102 may generate, store, receive, and send social-networking data, such as, for example, user-profile data, concept-profile data, social-graph information, or other suitable data related to the online social network. Networking system 1102 may be accessed by the other components of network environment 1100 either directly or via network 1104. In one or more embodiments, networking system 1102 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In one or more embodiments, each server may include hardware, software, or embedded logic components or a combination of two or more such components for carrying out the appropriate functionalities implemented or supported by server. In one or more embodiments, networking system 1102 may include one or more data stores. Data stores may be used to store various types of information. In one or more embodiments, the information stored in data stores may be organized according to specific data structures. In one or more embodiments, each data store may be a relational, columnar, correlation, or other suitable database. Although this disclosure describes or illustrates particular types of databases, this disclosure contemplates any suitable types of databases. One or more embodiments may provide interfaces that enable a client device 1106, a networking system 1102, or a third-party system 1108 to manage, retrieve, modify, add, or delete, the information stored in data store.

In one or more embodiments, networking system 1102 may store one or more social graphs in one or more data stores. In one or more embodiments, a social graph may include multiple nodes—which may include multiple user nodes (each corresponding to a particular user) or multiple concept nodes (each corresponding to a particular concept)—and multiple edges connecting the nodes. Networking system 1102 may provide users of the online social network the ability to communicate and interact with other users. In one or more embodiments, users may join the online social network via networking system 1102 and then add connections (e.g., relationships) to a number of other users of networking system 1102 that they want to be connected to. Herein, the term "friend" may refer to any other user of networking system 1102 with whom a user has formed a connection, association, or relationship via networking system 1102.

In one or more embodiments, networking system 1102 may provide users with the ability to take actions on various types of items or objects, supported by networking system 1102. As an example and not by way of limitation, the items and objects may include groups or social networks to which users of networking system 1102 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1102 or by an external system of third-party system 1108, which is separate from networking system 1102 and coupled to networking system 1102 via a network 1104.

In one or more embodiments, networking system 1102 may be capable of linking a variety of entities. As an example, and not by way of limitation, networking system 1102 may enable users to interact with each other as well as receive content from third-party systems 1108 or other entities, or to allow users to interact with these entities through an application programming interfaces (API) or other communication channels.

In one or more embodiments, a third-party system 1108 may include one or more types of servers, one or more data stores, one or more interfaces, including but not limited to APIs, one or more web services, one or more content sources, one or more networks, or any other suitable components, e.g., that servers may communicate with. A third-party system 1108 may be operated by a different entity from an entity operating networking system 1102. In one or more embodiments, however, networking system 1102 and third-party systems 1108 may operate in conjunction with each other to provide social-networking services to users of networking system 1102 or third-party systems 1108. In this sense, networking system 1102 may provide a platform, or backbone, which other systems, such as third-party systems 1108, may use to provide social-networking services and functionality to users across the Internet.

In one or more embodiments, a third-party system 1108 may include a third-party content object provider. A third-party content object provider may include one or more sources of content objects, which may be communicated to a client device 1106. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In one or more embodiments, networking system 1102 also includes user-generated content objects, which may enhance a user's interactions with networking system 1102. User-generated content may include anything a user can add, upload, send, or "post" to networking system 1102. As an example, and not by way of limitation, a user communicates posts to networking system 1102 from a client device 1106. Posts may include data such as status updates or other textual data, location information, photos, videos, links, music or other similar data or media. Content may also be added to networking system 1102 by a third-party through a "communication channel," such as a newsfeed or stream.

In one or more embodiments, networking system 1102 may include a variety of servers, sub-systems, programs, modules, logs, and data stores. In one or more embodiments, networking system 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1102 may also include suitable components such as network interfaces, security mechanisms, load balancers, failover servers, management-and-network-operations consoles, other suitable components, or any suitable combination thereof. In one or more embodiments, networking system 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1102 to one or more client devices 1106 or one or more third-party system 1108 via network 1104. The web server may include a mail server or other messaging functionality for receiving and routing messages between networking system 1102 and one or more client devices 1106. An API-request server may allow a third-party system 1108 to access information from networking system 1102 by calling one or more APIs. An action logger may be used to receive communications from a web server about a user's actions on or off networking system 1102. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106.

Authorization servers may be used to enforce one or more privacy settings of the users of networking system 1102. A privacy setting of a user determines how particular information associated with a user can be shared. The authorization server may allow users to opt in to or opt out of having their actions logged by networking system 1102 or shared with other systems (e.g., third-party system 1108), such as, for example, by setting appropriate privacy settings. Third-party-content-object stores may be used to store content objects received from third parties, such as a third-party system 1108. Location stores may be used for storing location information received from client devices 1106 associated with users. Advertisement-pricing modules may combine social information, the current time, location information, or other suitable information to provide relevant advertisements, in the form of notifications, to a user.

Figure 12:
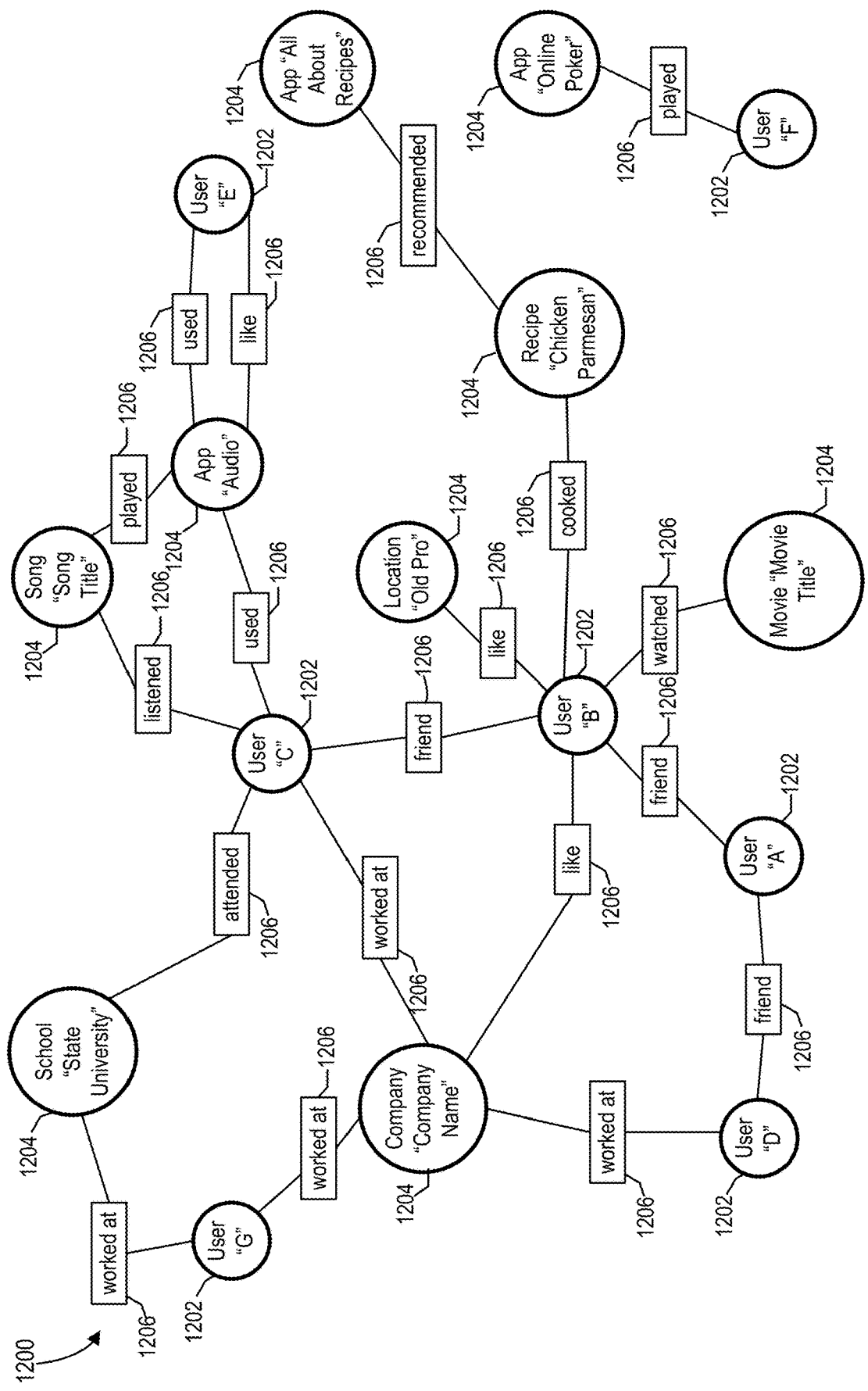
FIG. 12 illustrates an example social graph in accordance with one or more implementations.

FIG. 12 illustrates example social graph 1200. In one or more embodiments, networking system 1102 may store one or more social graphs 1200 in one or more data stores. In one or more embodiments, social graph 1200 may include multiple nodes—which may include multiple user nodes 1202 or multiple concept nodes 1204—and multiple edges 1206 connecting the nodes. Example social graph 1200 illustrated in FIG. 12 is shown, for didactic purposes, in a two-dimensional visual map representation. In one or more embodiments, a networking system 1102, client device 1106, or third-party system 1108 may access social graph 1200 and related social-graph information for suitable applications. The nodes and edges of social graph 1200 may be stored as data objects, for example, in a data store (such as a social-graph database). Such a data store may include one or more searchable or query able indexes of nodes or edges of social graph 1200.

In one or more embodiments, a user node 1202 may correspond to a user of networking system 1102. As an example, and not by way of limitation, a user may be an individual (human user), an entity (e.g., an enterprise, business, or third-party application), or a group (e.g., of individuals or entities) that interacts or communicates with or over networking system 1102. In one or more embodiments, when a user registers for an account with networking system 1102, networking system 1102 may create a user node 1202 corresponding to the user, and store the user node 1202 in one or more data stores. Users and user nodes 1202 described herein may, where appropriate, refer to registered users and user nodes 1202 associated with registered users. In addition, or as an alternative, users and user nodes 1202 described herein may, where appropriate, refer to users that have not registered with networking system 1102. In one or more embodiments, a user node 1202 may be associated with information provided by a user or information gathered by various systems, including networking system 1102. As an example, and not by way of limitation, a user may provide his or her name, profile picture, contact information, birth date, sex, marital status, family status, employment, education background, preferences, interests, or other demographic information. In one or more embodiments, a user node 1202 may be associated with one or more data objects corresponding to information associated with a user. In one or more embodiments, a user node 1202 may correspond to one or more webpages.

In one or more embodiments, a concept node 1204 may correspond to a concept. As an example and not by way of limitation, a concept may correspond to a place (such as, for example, a movie theater, restaurant, landmark, or city); a website (such as, for example, a website associated with networking system 1102 or a third-party website associated with a web-application server); an entity (such as, for example, a person, business, group, sports team, or celebrity); a resource (such as, for example, an audio file, video file, digital photo, text file, structured document, or application) which may be located within networking system 1102 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1204 may be associated with information of a concept provided by a user or information gathered by various systems, including networking system 1102. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In one or more embodiments, a concept node 1204 may be associated with one or more data objects corresponding to information associated with concept node 1204. In one or more embodiments, a concept node 1204 may correspond to one or more webpages.

In one or more embodiments, a node in social graph 1200 may represent or be represented by a webpage (which may be referred to as a "profile page"). Profile pages may be hosted by or accessible to networking system 1102. Profile pages may also be hosted on third-party websites associated with a third-party system 1108. As an example, and not by way of limitation, a profile page corresponding to a particular external webpage may be the particular external webpage and the profile page may correspond to a particular concept node 1204. Profile pages may be viewable by all or a selected subset of other users. As an example, and not by way of limitation, a user node 1202 may have a corresponding user-profile page in which the corresponding user may add content, make declarations, or otherwise express himself or herself. As another example and not by way of limitation, a concept node 1204 may have a corresponding concept-profile page in which one or more users may add content, make declarations, or express themselves, particularly in relation to the concept corresponding to concept node 1204.

In one or more embodiments, a concept node 1204 may represent a third-party webpage or resource hosted by a third-party system 1108. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1106 to send to networking system 1102 a message indicating the user's action. In response to the message, networking system 1102 may create an edge (e.g., an "eat" edge) between a user node 1202 corresponding to the user and a concept node 1204 corresponding to the third-party webpage or resource and store edge 1206 in one or more data stores.

In one or more embodiments, a pair of nodes in social graph 1200 may be connected to each other by one or more edges 1206. An edge 1206 connecting a pair of nodes may represent a relationship between the pair of nodes. In one or more embodiments, an edge 1206 may include or represent one or more data objects or attributes corresponding to the relationship between a pair of nodes. As an example, and not by way of limitation, a first user may indicate that a second user is a "friend" of the first user. In response to this indication, networking system 1102 may send a "friend request" to the second user. If the second user confirms the "friend request," networking system 1102 may create an edge 1206 connecting the first user's user node 1202 to the second user's user node 1202 in social graph 1200 and store edge 1206 as social-graph information in one or more of data stores. In the example of FIG. 12, social graph 1200 includes an edge 1206 indicating a friend relation between user nodes 1202 of user "A" and user "B" and an edge indicating a friend relation between user nodes 1202 of user "C" and user "B." Although this disclosure describes or illustrates particular edges 1206 with particular attributes connecting particular user nodes 1202, this disclosure contemplates any suitable edges 1206 with any suitable attributes connecting user nodes 1202. As an example, and not by way of limitation, an edge 1206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1200 by one or more edges 1206.

In one or more embodiments, an edge 1206 between a user node 1202 and a concept node 1204 may represent a particular action or activity performed by a user associated with user node 1202 toward a concept associated with a concept node 1204. As an example, and not by way of limitation, as illustrated in FIG. 12, a user may "like," "attended," "played," "listened," "cooked," "worked at," or "watched" a concept, each of which may correspond to an edge type or subtype. A concept-profile page corresponding to a concept node 1204 may include, for example, a selectable "check in" icon (such as, for example, a clickable "check in" icon) or a selectable "add to favorites" icon. Similarly, after a user clicks these icons, networking system 1102 may create a "favorite" edge or a "check in" edge in response to a user's action corresponding to a respective action. As another example and not by way of limitation, a user (user "C") may listen to a particular song ("Ramble On") using a particular application (MUSIC, which is an online music application). In this case, networking system 1102 may create a "listened" edge 1206 and a "used" edge (as illustrated in FIG. 12) between user nodes 1202 corresponding to the user and concept nodes 1204 corresponding to the song and application to indicate that the user listened to the song and used the application. Moreover, networking system 1102 may create a "played" edge 1206 (as illustrated in FIG. 12) between concept nodes 1204 corresponding to the song and the application to indicate that the particular song was played by the particular application. In this case, "played" edge 1206 corresponds to an action performed by an external application (MUSIC) on an external audio file (the song "Imagine"). Although this disclosure describes particular edges 1206 with particular attributes connecting user nodes 1202 and concept nodes 1204, this disclosure contemplates any suitable edges 1206 with any suitable attributes connecting user nodes 1202 and concept nodes 1204. Moreover, although this disclosure describes edges between a user node 1202 and a concept node 1204 representing a single relationship, this disclosure contemplates edges between a user node 1202 and a concept node 1204 representing one or more relationships. As an example, and not by way of limitation, an edge 1206 may represent both that a user likes and has used at a particular concept. Alternatively, another edge 1206 may represent each type of relationship (or multiples of a single relationship) between a user node 1202 and a concept node 1204 (as illustrated in FIG. 12 between user node 1202 for user "E" and concept node 1204 for "MUSIC").

In one or more embodiments, networking system 1102 may create an edge 1206 between a user node 1202 and a concept node 1204 in social graph 1200. As an example and not by way of limitation, a user viewing a concept-profile page (such as, for example, by using a web browser or a special-purpose application hosted by the user's client device 1106) may indicate that he or she likes the concept represented by the concept node 1204 by clicking or selecting a "Like" icon, which may cause the user's client device 1106 to send to networking system 1102 a message indicating the user's liking of the concept associated with the concept-profile page. In response to the message, networking system 1102 may create an edge 1206 between user node 1202 associated with the user and concept node 1204, as illustrated by "like" edge 1206 between the user and concept node 1204. In one or more embodiments, networking system 1102 may store an edge 1206 in one or more data stores. In one or more embodiments, an edge 1206 may be automatically formed by networking system 1102 in response to a particular user action. As an example, and not by way of limitation, if a first user uploads a picture, watches a movie, or listens to a song, an edge 1206 may be formed between user node 1202 corresponding to the first user and concept nodes 1204 corresponding to those concepts. Although this disclosure describes forming particular edges 1206 in particular manners, this disclosure contemplates forming any suitable edges 1206 in any suitable manner.

In one or more embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on networking system 1102). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results page, where sponsored content is promoted over non-sponsored content.

In one or more embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1102 may execute or modify a particular action of the user.

An advertisement may also include social-networking-system functionality that a user may interact with. As an example, and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1102) or RSVP (e.g., through networking system 1102) to an event associated with the advertisement. In addition, or as an alternative, an advertisement may include social-networking-system context directed to the user. As an example, and not by way of limitation, an advertisement may display information about a friend of the user within networking system 1102 who has taken an action associated with the subject matter of the advertisement.

In one or more embodiments, networking system 1102 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1108 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In one or more embodiments, networking system 1102 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In one or more embodiments, networking system 1102 may use a variety of factors to calculate a coefficient. These factors may include, for example, user actions, types of relationships between objects, location information, other suitable factors, or any combination thereof. In one or more embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In one or more embodiments, the networking system 1102 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In one or more embodiments, networking system 1102 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In one or more embodiments, networking system 1102 may calculate a coefficient based on a user's actions. Networking system 1102 may monitor such actions on the online social network, on a third-party system 1108, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In one or more embodiments, networking system 1102 may calculate a coefficient based on the user's actions with particular types of content. The content may be associated with the online social network, a third-party system 1108, or another suitable system. The content may include users, profile pages, posts, news stories, headlines, instant messages, chat room conversations, emails, advertisements, pictures, video, music, other suitable objects, or any combination thereof. Networking system 1102 may analyze a user's actions to determine whether one or more of the actions indicate an affinity for subject matter, content, other users, and so forth. As an example, and not by way of limitation, if a user may make frequently posts content related to "coffee" or variants thereof, networking system 1102 may determine the user has a high coefficient with respect to the concept "coffee." Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In one or more embodiments, networking system 1102 may calculate a coefficient based on the type of relationship between particular objects. Referencing the social graph 1200, networking system 1102 may analyze the number and/or type of edges 1206 connecting particular user nodes 1202 and concept nodes 1204 when calculating a coefficient. As an example, and not by way of limitation, user nodes 1202 that are connected by a spouse-type edge (representing that the two users are married) may be assigned a higher coefficient than a user node 1202 that are connected by a friend-type edge. In other words, depending upon the weights assigned to the actions and relationships for the particular user, the overall affinity may be determined to be higher for content about the user's spouse than for content about the user's friend. In one or more embodiments, the relationships a user has with another object may affect the weights and/or the ratings of the user's actions with respect to calculating the coefficient for that object. As an example, and not by way of limitation, if a user is tagged in first photo, but merely likes a second photo, networking system 1102 may determine that the user has a higher coefficient with respect to the first photo than the second photo because having a tagged-in-type relationship with content may be assigned a higher weight and/or rating than having a like-type relationship with content. In one or more embodiments, networking system 1102 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, networking system 1102 may determine that the first user should also have a relatively high coefficient for the particular object. In one or more embodiments, the coefficient may be based on the degree of separation between particular objects. The lower coefficient may represent the decreasing likelihood that the first user will share an interest in content objects of the user that is indirectly connected to the first user in the social graph 1200. As an example, and not by way of limitation, social-graph entities that are closer in the social graph 1200 (i.e., fewer degrees of separation) may have a higher coefficient than entities that are further apart in the social graph 1200.

In one or more embodiments, networking system 1102 may calculate a coefficient based on location information. Objects that are geographically closer to each other may be considered to be more related, or of more interest, to each other than more distant objects. In one or more embodiments, the coefficient of a user towards a particular object may be based on the proximity of the object's location to a current location associated with the user (or the location of a client device 1106 of the user). A first user may be more interested in other users or concepts that are closer to the first user. As an example, and not by way of limitation, if a user is one mile from an airport and two miles from a gas station, networking system 1102 may determine that the user has a higher coefficient for the airport than the gas station based on the proximity of the airport to the user.

In one or more embodiments, networking system 1102 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1102 may provide information that is relevant to user's interests and current circumstances, increasing the likelihood that they will find such information of interest. In one or more embodiments, networking system 1102 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In one or more embodiments, networking system 1102 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In one or more embodiments, networking system 1102 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1108 (e.g., via an API or other communication channel), or from another suitable system. In response to the request, networking system 1102 may calculate the coefficient (or access the coefficient information if it has previously been calculated and stored). In one or more embodiments, networking system 1102 may measure an affinity with respect to a particular process. Different processes (both internal and external to the online social network) may request a coefficient for a particular object or set of objects. Networking system 1102 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, one or more embodiments may utilize one or more systems, components, elements, functions, methods, operations, or steps disclosed in U.S. patent application Ser. No. 11/503,093, filed 11 Aug. 2006, U.S. patent application Ser. No. 12/971,1027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In one or more embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In one or more embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In one or more embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node 1204 corresponding to a particular photo may have a privacy setting specifying that the photo may only be accessed by users tagged in the photo and their friends. In one or more embodiments, privacy settings may allow users to opt in or opt out of having their actions logged by networking system 1102 or shared with other systems (e.g., third-party system 1108). In one or more embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1108, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In one or more embodiments, one or more servers may be authorization/privacy servers for enforcing privacy settings. In response to a request from a user (or other entity) for a particular object stored in a data store, networking system 1102 may send a request to the data store for the object. The request may identify the user associated with the request and may only be sent to the user (or a client device 1106 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method, comprising:
    detecting, from an extended-reality device corresponding to a user of a networking system, a request to modify an appearance of an avatar of the user displayed within a virtual-reality environment on the extended-reality device;
    providing, for display on the extended-reality device, a context-aware avatar editor as an overlay within the virtual-reality environment to modify the displayed avatar, the context-aware avatar editor providing avatar modification options that are contextually relevant to the virtual-reality environment and comprising at least one context-based graphical asset for modifying the appearance of the avatar, the context-based graphical asset being selected based on a contextual mapping between the virtual-reality environment and the context-based graphical asset; and
    modifying the avatar displayed within the virtual-reality environment based on a user selection of the context-based graphical asset within the context-aware avatar editor, wherein the avatar is modified without interrupting the virtual-reality environment.

2. The computer-implemented method of claim 1, further comprising providing the context-aware avatar editor as the overlay within the virtual-reality environment while the user remains active within the virtual-reality environment.

3. The computer-implemented method of claim 1, further comprising:
    determining a context of the virtual-reality environment; and
    selecting the context-based graphical asset based on the context of the virtual-reality environment.

4. The computer-implemented method of claim 3, wherein:
    determining the context of the virtual-reality environment comprises determining a theme of the virtual-reality environment; and
    selecting the context-based graphical asset based on the context of the virtual-reality environment comprises identifying the context-based graphical asset from an avatar graphical asset repository based on mapping one or more contextual tags associated with the context-based graphical asset to the theme of the virtual-reality environment.

5. The computer-implemented method of claim 1, further comprising providing a context-aware avatar editor data package to a third-party application corresponding to the virtual-reality environment to cause the virtual-reality environment to display the context-aware avatar editor as an overlay within the virtual-reality environment.

6. The computer-implemented method of claim 1, further comprising identifying the context-based graphical asset for the user of the networking system utilizing a contextual recommendation engine.

7. The computer-implemented method of claim 6, further comprising identifying the context-based graphical asset utilizing the contextual recommendation engine based on virtual-reality environment data corresponding to the virtual-reality environment.

8. The computer-implemented method of claim 6, further comprising identifying the context-based graphical asset utilizing the contextual recommendation engine based on user data corresponding to the user of the networking system.

9. The computer-implemented method of claim 6, wherein identifying the context-based graphical asset for the user of the networking system utilizing the contextual recommendation engine comprises utilizing a machine learning model or a historical user selection model to determine a plurality of context-based graphical assets to recommend in the context-aware avatar editor based on a context of the virtual-reality environment.

10. The computer-implemented method of claim 1, further comprising:
    identifying the context-based graphical asset for the context-aware avatar editor based on a location represented within the virtual-reality environment; and
    upon detecting user navigation to a subsequent location represented within the virtual-reality environment:
    identifying a subsequent context-based graphical asset for the context-aware avatar editor based on the subsequent location; and
    providing the subsequent context-based graphical asset for display within the context-aware avatar editor.

11. The computer-implemented method of claim 1, wherein providing the context-aware avatar editor comprising the context-based graphical asset comprises providing a visual element for an appearance of the avatar or a graphical skin for the avatar.

12. A non-transitory computer-readable medium storing instructions thereon that, when executed by at least one processor, cause a computing device to:
    detect, from an extended-reality device corresponding to a user of a networking system, a request to modify an appearance of an avatar of the user displayed within a virtual-reality environment on the extended-reality device;
    provide, for display on the extended-reality device, a context-aware avatar editor as an overlay within the virtual-reality environment to modify the displayed avatar, the context-aware avatar editor providing avatar modification options that are contextually relevant to the virtual-reality environment and comprising at least one context-based graphical asset for modifying the appearance of the avatar, the context-based graphical asset being selected based on a contextual mapping between the virtual-reality environment and the context-based graphical asset; and
    modify the avatar displayed within the virtual-reality environment based on a user selection of the context-based graphical asset within the context-aware avatar editor, wherein the avatar is modified without interrupting the virtual-reality environment.

13. The non-transitory computer-readable medium of claim 12, further comprising instructions that, when executed by the at least one processor, cause the computing device to provide the context-aware avatar editor as the overlay within the virtual-reality environment while the user remains active within the virtual-reality environment.

14. The non-transitory computer-readable medium of claim 12, further comprising instructions that, when executed by the at least one processor, cause the computing device to integrate a context-aware avatar editor data package within a third-party application corresponding to the virtual-reality environment to cause the virtual-reality environment to display the context-aware avatar editor as an overlay within the virtual-reality environment.

15. The non-transitory computer-readable medium of claim 12, further comprising instructions that, when executed by the at least one processor, cause the computing device to identify the context-based graphical asset for the user of the networking system utilizing a contextual recommendation engine with virtual-reality environment data corresponding to the virtual-reality environment or user data corresponding to the user of the networking system.

16. A system comprising:
   at least one processor; and
   at least one non-transitory computer-readable medium comprising instructions that, when executed by the at least one processor, cause the system to:
   detect, from an extended-reality device corresponding to a user of a networking system, a request to modify an appearance of an avatar of the user displayed within a virtual-reality environment on the extended-reality device;
   provide, for display on the extended-reality device, a context-aware avatar editor as an overlay within the virtual-reality environment to modify the displayed avatar, the context-aware avatar editor providing avatar modification options that are contextually relevant to the virtual-reality environment and comprising at least one context-based graphical asset for modifying the appearance of the avatar, the context-based graphical asset being selected based on a contextual mapping between the virtual-reality environment and the context-based graphical asset; and
   modify the avatar displayed within the virtual-reality environment based on a user selection of the context-based graphical asset within the context-aware avatar editor, wherein the avatar is modified without interrupting the virtual-reality environment.

17. The system of claim 16, further comprising instructions that, when executed by the at least one processor, cause the system to provide the context-aware avatar editor as the overlay within the virtual-reality environment while the user remains active within the virtual-reality environment.

18. The system of claim 16, further comprising instructions that, when executed by the at least one processor, cause the system to identify the context-based graphical asset for the user of the networking system utilizing a contextual recommendation engine.

19. The system of claim 18, further comprising instructions that, when executed by the at least one processor, cause the system to identify the context-based graphical asset for the user of the networking system utilizing the contextual recommendation engine based on a social graph associated with the user.

20. The system of claim 16, further comprising instructions that, when executed by the at least one processor, cause the system to provide the modified avatar within an additional virtual-reality environment based on the user selection within the context-aware overlay editor from the virtual-reality environment.

* * * * *